United States Patent [19]

Gottlieb et al.

[11] Patent Number: 4,525,788

[45] Date of Patent: Jun. 25, 1985

[54] SCANNER INTERFACE CIRCUIT FOR UNIVERSAL MULTI-STATION DOCUMENT INSERTER

[75] Inventors: Robert K. Gottlieb, Bridgeport; Peter N. Piotroski, New Canaan, both of Conn.

[73] Assignee: Pitney Bowes Inc., Stamford, Conn.

[21] Appl. No.: 394,390

[22] Filed: Jul. 1, 1982

[51] Int. Cl.[3] .......................... G06F 15/20; G06G 7/48

[52] U.S. Cl. ...................................... 364/478; 364/138; 364/146; 364/471; 364/900; 270/58; 271/3.1; 271/4; 271/259; 53/500; 53/540

[58] Field of Search ............... 364/471, 478, 138, 146, 364/188, 200, 900; 270/53, 54, 55, 56, 57, 58; 271/258, 259, 3.1, 4; 53/495, 500, 540

[56] References Cited

U.S. PATENT DOCUMENTS

| | | | |
|---|---|---|---|
| 3,606,728 | 9/1971 | Sather et al. | 270/58 |
| 3,804,005 | 4/1974 | Burges et al. | 270/58 |
| 3,899,165 | 8/1975 | Abram et al. | 270/54 |
| 4,022,455 | 5/1977 | Newsome et al. | 270/54 |
| 4,121,818 | 10/1978 | Riley et al. | 364/478 |
| 4,388,994 | 6/1983 | Sada et al. | 270/58 |
| 4,395,031 | 7/1983 | Gruber et al. | 270/54 |

*Primary Examiner*—Jerry Smith
*Assistant Examiner*—John R. Lastova
*Attorney, Agent, or Firm*—Michael J. DeSha; Martin D. Wittstein; William D. Soltow, Jr.

[57] ABSTRACT

A method and associate apparatus for providing a scanner interface circuit for a universal multi-station document inserter having a plurality of document feeder stations has a central processor which stores a supervisory program and scanner interface circuits associated with at least some of the feeder stations. Each scanner interface circuit has a unique address, a portion of which is shared with that of its associated feeder station and a distributed processor which stores a scanner program containing instructions for scanning coded documents. The scanner circuit, in response to address signals received from the central processor, scans the coded document and provides document present and end of collation signals to the central processor. A programmable counter is provided in the scanner circuit to provide timing signals for reading codes on coded documents.

11 Claims, 39 Drawing Figures

TO FIG. 5B.

FROM FIG. 5C

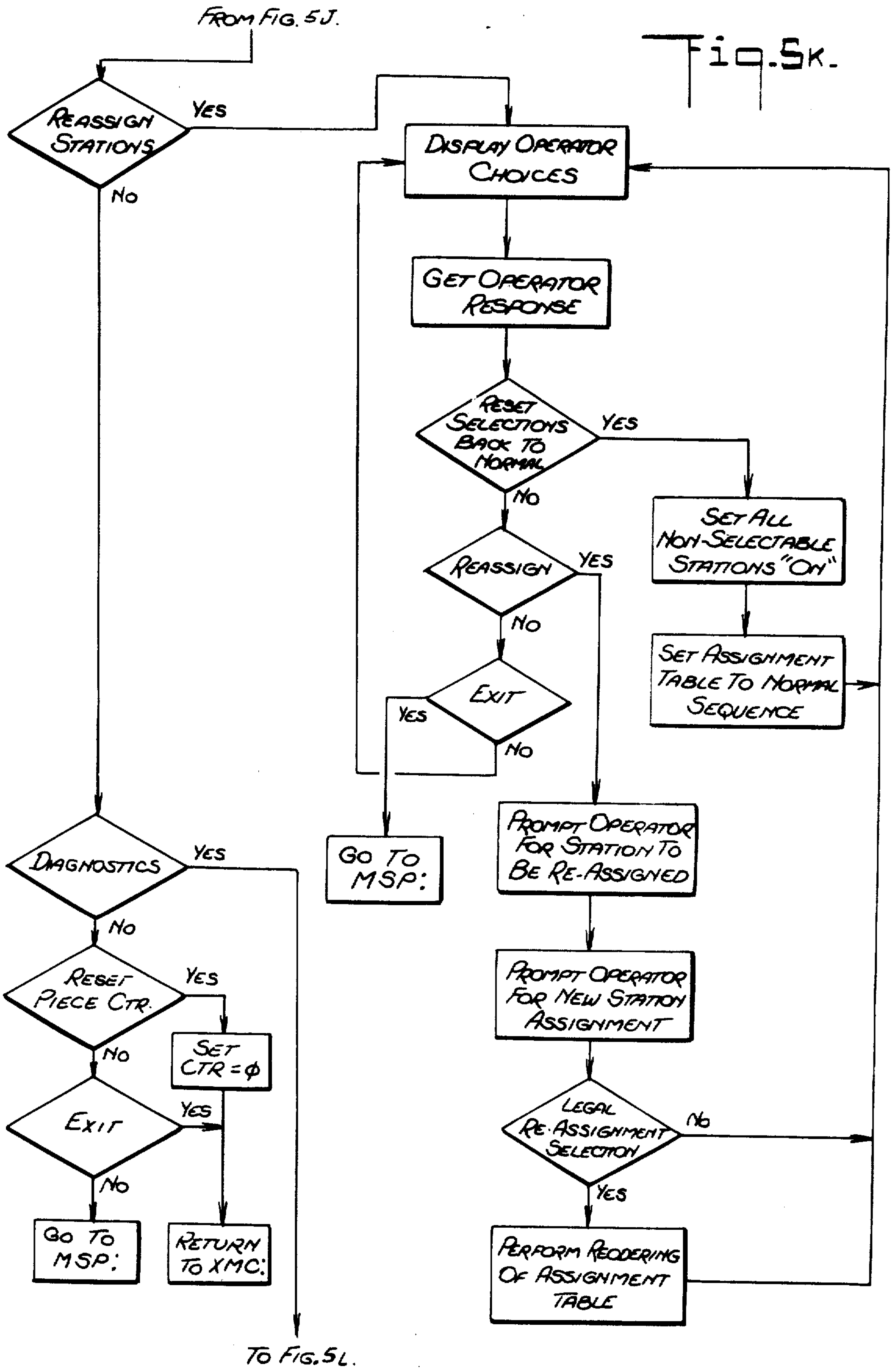
FROM FIG. 5J.
FIG. 5K.
REASSIGN STATIONS
YES
NO
DISPLAY OPERATOR CHOICES
GET OPERATOR RESPONSE
RESET SELECTIONS BACK TO NORMAL
YES
NO
SET ALL NON-SELECTABLE STATIONS "ON"
SET ASSIGNMENT TABLE TO NORMAL SEQUENCE
REASSIGN
YES
NO
EXIT
YES
NO
GO TO MSP:
PROMPT OPERATOR FOR STATION TO BE RE-ASSIGNED
PROMPT OPERATOR FOR NEW STATION ASSIGNMENT
LEGAL RE-ASSIGNMENT SELECTION
NO
YES
PERFORM REODERING OF ASSIGNMENT TABLE
DIAGNOSTICS
YES
NO
RESET PIECE CTR.
YES
NO
SET CTR = φ
EXIT
YES
NO
GO TO MSP:
RETURN TO XMC:
TO FIG. 5L.

FROM FIG. 5K.

Fig 6L.

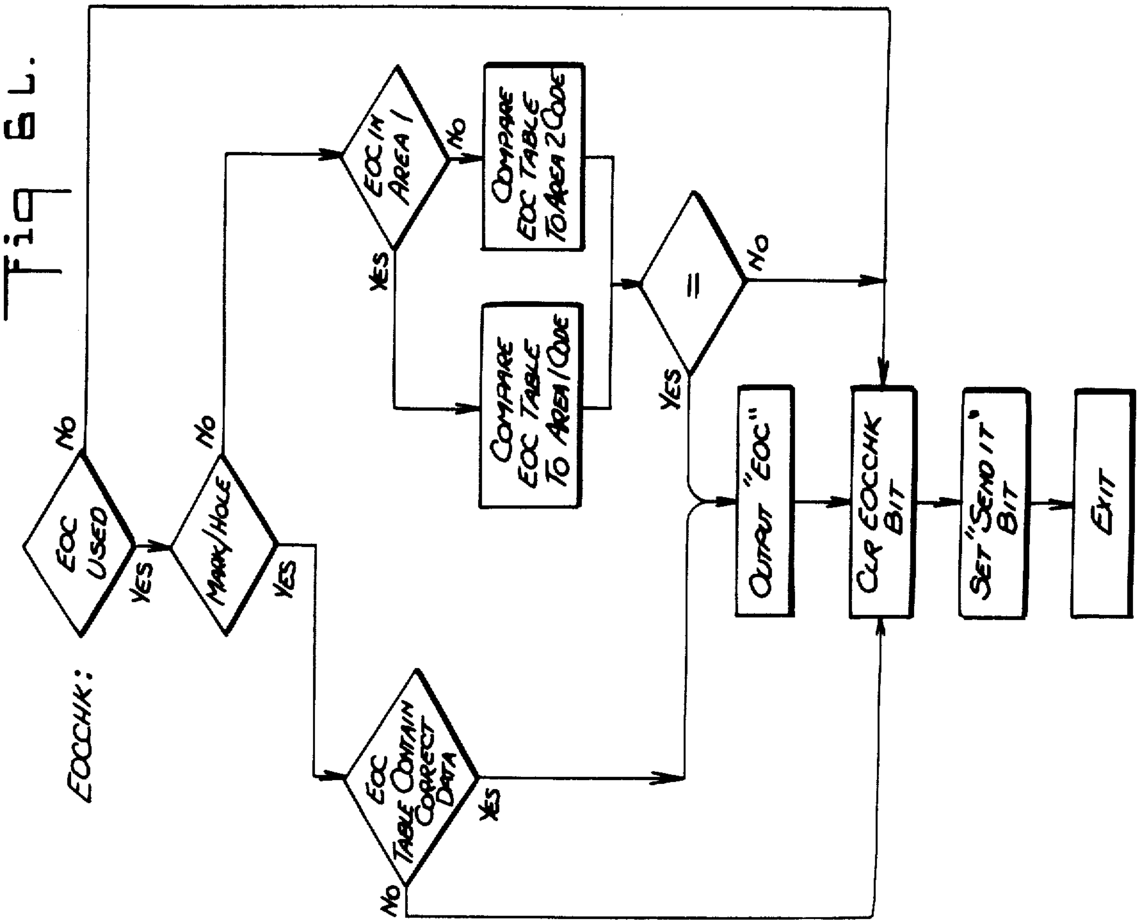
EOCCHK:
EOC USED
YES
NO
MARK/HOLE
NO
YES
EOC IN AREA 1
YES
NO
COMPARE EOC TABLE TO AREA 1 CODE
COMPARE EOC TABLE TO AREA 2 CODE
=
YES
NO
EOC TABLE CONTAIN CORRECT DATA
YES
NO
OUTPUT "EOC"
CLR EOCCHK BIT
SET "SEND IT" BIT
EXIT

Fig. 6K.

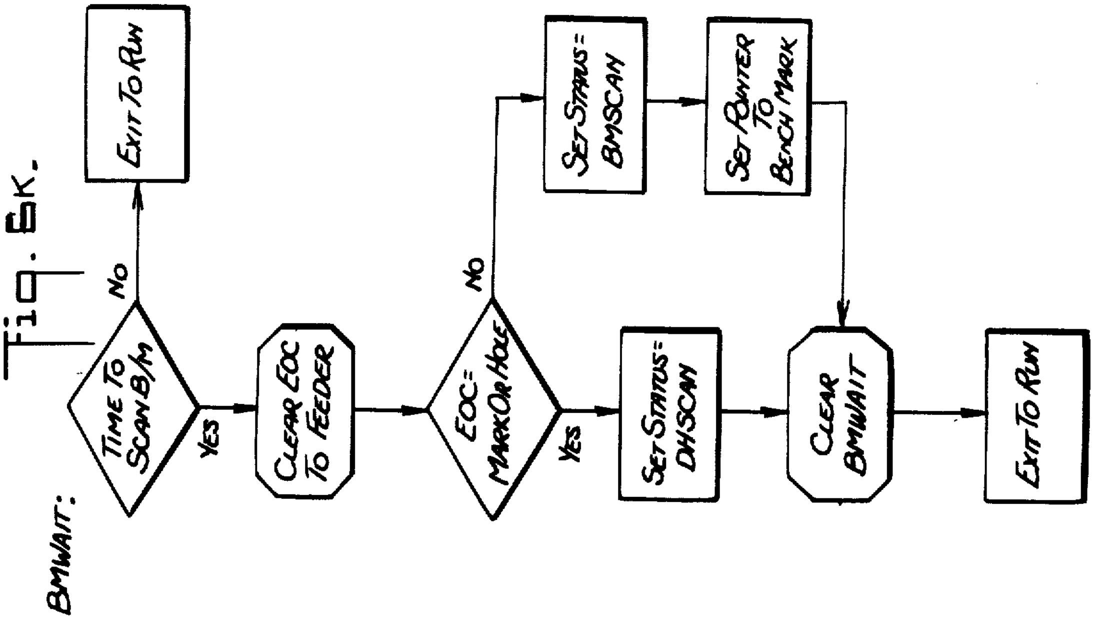
BMWAIT:
TIME TO SCAN B/M
YES
NO
EXIT TO RUN
CLEAR EOC TO FEEDER
EOC= MARK OR HOLE
YES
NO
SET STATUS= BMSCAN
SET POINTER TO BENCH MARK
SET STATUS= DHSCAN
CLEAR BMWAIT
EXIT TO RUN

SCANNER INTERFACE CIRCUIT FOR UNIVERSAL MULTI-STATION DOCUMENT INSERTER

MICROFICHE APPENDIX

The supervisory program for the central processor is set forth in the accompanying microfiche appendix including 3 microfiche having a total of 174 frames.

The program for the scanner interface circuit is set forth in the accompanying microfiche appendix including 1 microfiche having a total of 27 frames.

RELATED APPLICATIONS

This application is related to U.S. application Ser. No. 394,388 entitled "UNIVERSAL MULTI-STATION DOCUMENT INSERTER" filed on July 1, 1982 in the names of Peter N. Piotroski and John M. Gomes; U.S. application Ser. No. 394,385 filed on July 1, 1982 in the names of Peter N. Piotroski and John M. Gomes and entitled "METHOD AND APPARATUS FOR CUSTOMIZING A MULTI-STATION DOCUMENT INSERTER"; U.S application Ser. No. 394,389 filed on July 1, 1982 in the name of Peter N. Piotroski and entitled "MULTI-STATION DOCUMENT INSERTER WITH AUTOMATIC START UP AND SHUT DOWN DOCUMENT COLLATION SEQUENCES"; U.S. application Ser. No. 394,386 filed on July 1, 1982 in the names of Peter N. Piotroski and John M. Gomes and entitled "USER FRIENDLY CENTRAL CONTROL DISPLAY FOR A MULTI-STATION DOCUMENT INSERTER"; U.S. application Ser. No. 394,384 filed on July 1,1982 in the names of Peter N. Piotroski and John M. Gomes and entitled "DIAGNOSTIC MODE FOR A MULTI-STATION DOCUMENT INSERTER"; U.S. application Ser. No. 394,383 filed on July 1, 1982 in the names of Peter M. Piotroski and John M. Gomes and entitled "FEEDER INTERFACE CIRCUIT FOR UNIVERSAL MULTI-STATION DOCUMENT INSERTER"; and U.S. application Ser. No. 394,387 filed on July 1, 1982 in the names of Peter M. Piotroski and John M. Gomes and entitled "TRANSPORT INTERFACE CIRCUIT FOR UNIVERSAL MULTI-STATION DOCUMENT INSERTER", each of which copending applications is assigned to the assignee of the present invention. The specific and entire disclosure of the aforementioned application is specifically incorporated herein by reference for the purpose of further explaining the nature of operation of the present invention.

BACKGROUND OF THE INVENTION

The present invention relates to document inserters of the multi-station type and more particularly to scanner interface circuits therefor.

Known multi-station document inserters and the scanner circuits employed therein are generally designed and manufactured for a specific customer application. Such machines generally require a substantial period of time to design and manufacture including the individual wiring and/or programming of circuits such as scanner circuits employed therein. This adds substantially to the cost of such machines and limits their utility to the specific customer application and configuration for which they were designed. One such document inserter is disclosed in the U.S. Pat. No. 3,606,728 issued Sept. 21, 1971 to Sather et al, and assigned to Bell & Howell Co., Phillipsburg, N.J.

SUMMARY OF THE INVENTION

It is an object of the present invention to provide a scanner interface circuit for a universal multi-station document inserter.

It is further object of the present invention to provide a scanner interface circuit for a multi-station document inserter, which is capable of operating with a variety of different types of feeder modules or stations including for example, high ratio document feeders, high speed document feeders, standard document feeders, burster-folders, folder-feeders, divider page extractors, envelope feeders and the like, without the need for rewiring or reprogramming the device.

It is a still further object of the present invention to provide a scanner interface circuit which permits modularly expanding the multi-station document inserter without having to rewire or reprogram the device.

It is a still further object of the present invention to provide a scanner interface circuit for a multi-station document inserter whose configuration and functions can be changed without the need for rewiring or reprogramming the device.

Briefly and in accordance with the present invention a method and associated apparatus for providing a scanner interface circuit for a universal multi-station document inserter having a plurality of document feeder stations has a central processor which stores a supervisory program and scanner interface circuits associated with at least some of the feeder stations. Each scanner interface circuit has a unique address, a portion of which is shared with that of its associated feeder station and a distributed processor which stores a scanner program containing instructions for scanning coded documents. The scanner circuit, in response to address and command signals received from the central processor and its associated feeder interface circuit scans the coded document and provides end of collation signals to the feeder interface circuit and the scanned coded data to the central processor. A programmable counter is provided in the scanner circuit to provide timing signals for reading codes on coded documents.

Other objects and advantages of the present invention will become apparent upon reading the following detailed description considered in conjunction with the preferred embodiment of the invention illustrated in the drawings as follows:

BRIEF DESCRIPTION OF THE DRAWINGS

FIGS. 5*a*–5*h*, 5*j*–5*n* are flow charts of the supervisory program employed in the supervisory control circuit of the multi-station document inserter;

FIGS. 6*a*–6*h*, 6*j*–6*n*, 6*p*–6*r* are flow charts of the scanner program employed in the scanner interface circuit of the multi-station document inserter.

DESCRIPTION OF THE INVENTION

While the present invention will be described in connection with a preferred embodiment thereof, it will be understood that it is not intended to limit the invention to that embodiment only. On the contrary, it is intended to cover all alternatives, modifications and equivalents as may be reasonably included within the spirit and scope of the invention as defined by the appended claims.

Figure 1:
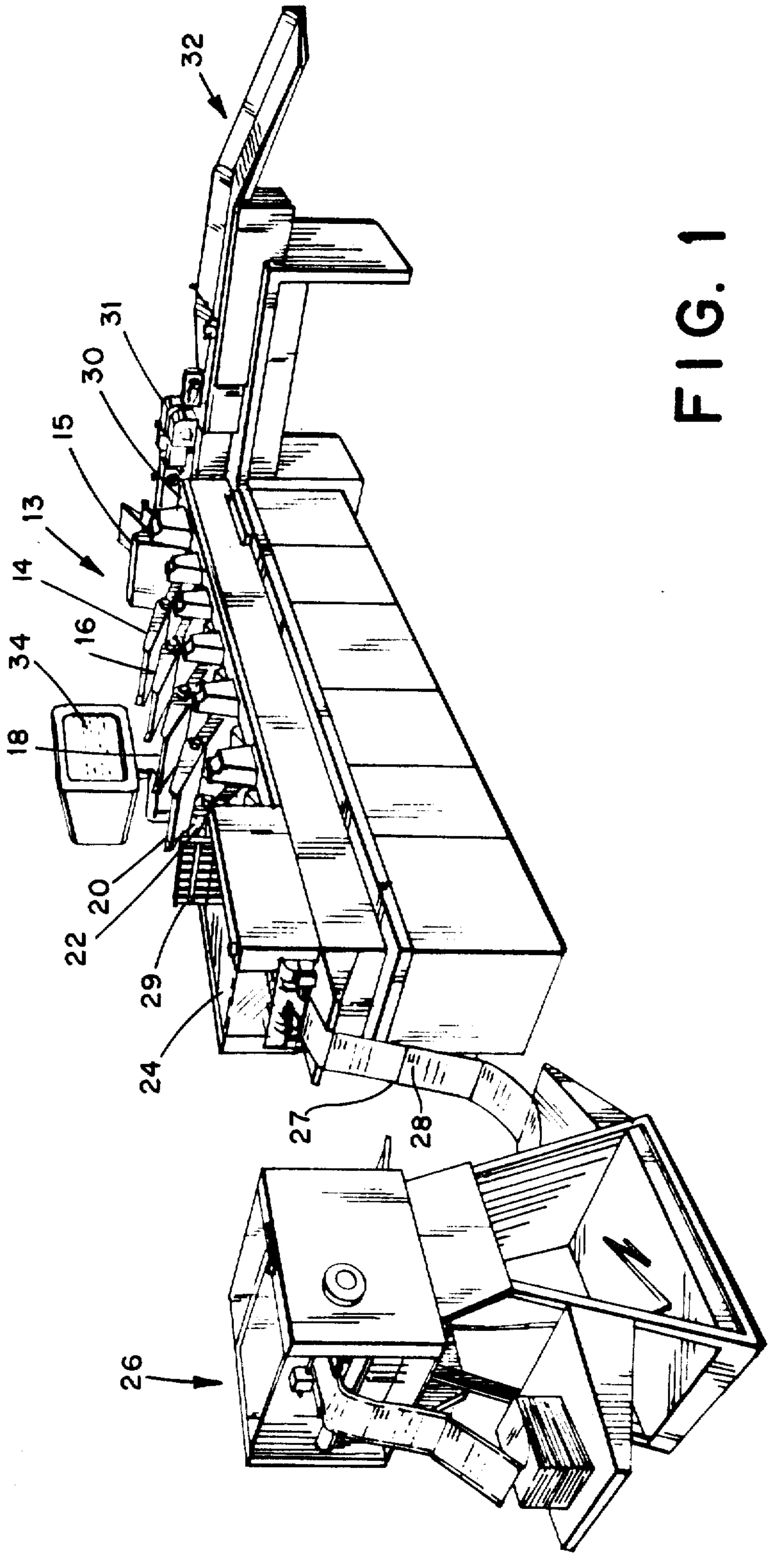
FIG. 1 is a prospective view of a multi-station document inserter employed with the present invention.

Referring to FIG. 1, a document inserter in accordance with the present invention is generally illustrated at 13. The document inserter 13 includes a plurality of serially arranged modules including an envelope feeder station or module 15 and six document feeder stations or modules, including five feeder modules designated 14, 16, 18, 20, 22, and burster-folder station or module 24. A computer generated forms 26 feeds continuous form control documents 27 having coded marks 28 thereon to the burster-folder 24 for separating and folding. The coded marks 28 on the control documents 27 are sensed by a control scanner 29. Thereafter the serially arranged feeder stations 22, 20, 18, 16 and 14 sequentially feed the necessary documents onto the transport deck 30 at each station as the control document 27 arrives at the respective station to form a precisely collated stack of documents which is to be transferred to the envelope feeder 15.

The collated stack of documents is inserted in an envelope at the envelope station 15. The necessary postage is provided and the envelope is sealed by a meter 31. As desired, the completed envelopes may then be transported to a single or multi-station level stacker 32. Further details regarding the inserter may be obtained from the above-noted patent application entitled "UNIVERSAL MULTI-STATION DOCUMENT INSERTER".

The inserter 13 also includes a central control display 34 which displays status messages and fault signals in human readable form and further enables the operator to control and change the configuration of the inserter 13 by way of finger touch switches as is described in further detail in the above-noted application entitled "USER FRIENDLY CENTRAL CONTROL DISPLAY FOR A MULTI-STATION DOCUMENT INSERTER".

Figures 2, 2A:
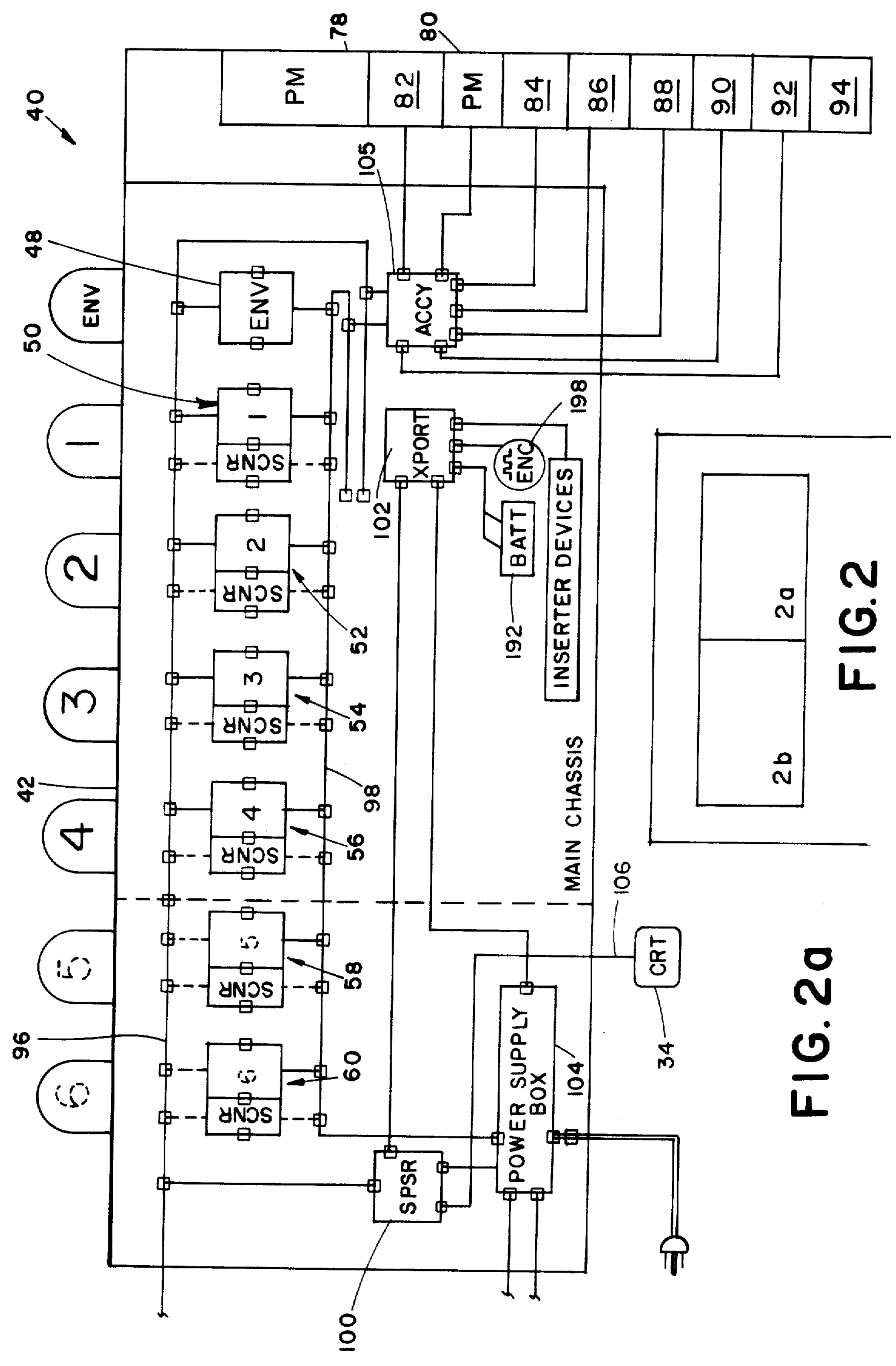
FIG. 2 comprised of *2a–2b* shows schematic diagrams of the layout of the feeder modules and circuits employed in the multi-station document inserter.
Figure 2B:
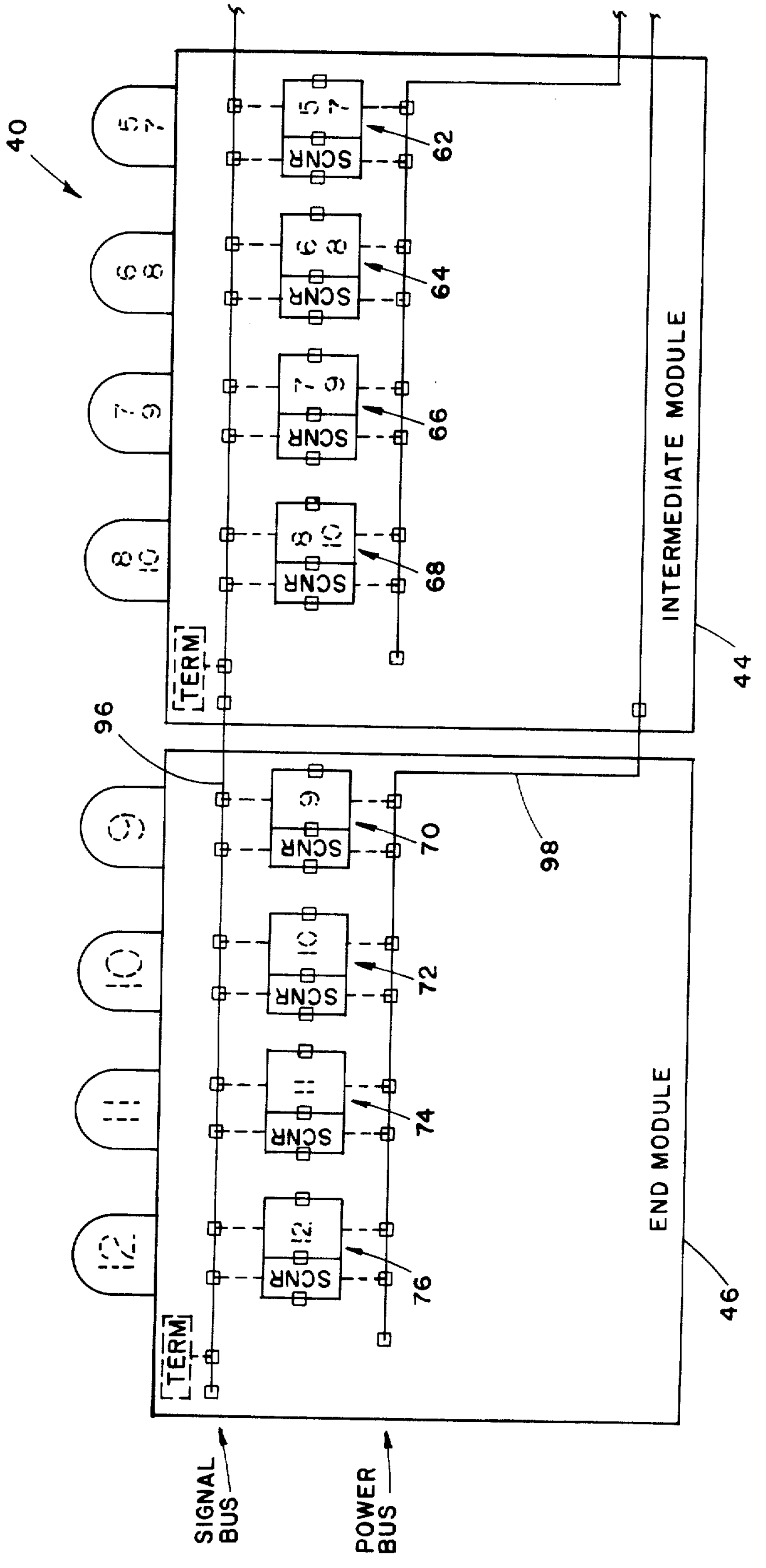

Referring to FIG. 2, the layout of the feeder module and circuits of the document inserter 13 is illustrated. This document inserter is designated 40. It is similar to the document inserter shown in FIG. 1, but shows the modular arrangement of feeder modules having a varying number of feeder modules between four and twelve as desired. A main chassis 42 includes four of six document feeder stations, excluding the envelope feeder 48. An intermediate modular 44 includes four document feeder stations and an end modular 46 also includes four feeder stations. Each of the feeder stations 48 through 76 has a unique address code in the signal bus 96. Further, the feeder station 76 most remote from the envelope feeder station 48, which is normally, but not necessarily a burster-folder, includes a control scanner interface circuit which will be described in more detail hereinafter. Advantageously, any scanning multi-document feeder may be used in this position to feed a control document. The other feeder stations will also typically include a scanner interface circuit to provide additional control. Further, each feeder module 48 through 76 will include a feeder interface circuit which is described in more detail in the above-noted copending application entitled "FEEDER INTERFACE CIRCUIT FOR UNIVERSAL MULTI-STATION DOCUMENT INSERTER". Advantageously, the scanner interface circuits for each feeder module are physically the same. This is highly advantageous in providing a universal multi-station document inserter with intelligence present at each feeder/scanner module capable of carrying out certain feeding/scanning operations in response to a central control command.

Further, as seen in FIG. 2, a supervisory control circuit 100 is electrically coupled to the signal bus 96 and to a transport interface circuit 102. A power supply 104 is coupled to the power bus 98, the supervisory control circuit 100 and to the transport interface circuit 102. The feeder interface circuit and to the transport interface circuit 102. The feeder interface circuit and scanner interface circuits in the feeder modules 50 through 76 are arranged in parallel between the signal bus 96 and the power bus 98. Also coupled to the signal bus 96 and power bus 98 is an accessory interface circuit 105. In response to signals from the supervisory control circuit 100, the accessory interface circuit 105 provides output signals to various accessories such as postage meters 78 and 80 and the multi-level power stackers 82 and 84 through 94. Coupled to the supervisory control circuit 100 is the central control display 34 (see FIG. 1).

The supervisory control circuit for central microprocessor 100 includes a single board computer and an auxilliary memory board. The single board microcomputer and auxilliary memory board also include plug-in sockets for receiving programmable read only memory (PROMS). A supervisory program capable of running all of the devices of the inserter and performing all desired control functions is stored in the plug-in PROMS which are plugged into the single board microcomputer and the auxilliary memory board. The program listing for the supervisory program is set forth in the accompanying Microfiche Appendix. An additional PROM (a configuration PROM) includes a data table which specifies a particular inserter configuration and the functions to be performed for that configuration by the executable routines in the supervisory programs. The details of generating a configuration PROM for use in the universal multi-station document inserter of the present invention are found in the above-mentioned application entitled "METHOD AND APPARATUS FOR CUSTOMIZING A MULTI-STATION DOCUMENT INSERTER".

By using the foregoing format for the supervisory control circuit for central microprocessor 100, there is no need to change any of the executable programs. Thus the same supervisory program may be incorporated into the supervisory control circuit 100 of each multi-station document inserter. The configuration PROM contains no executable programs but only a table of data which specifies a particular routine to be executed to provide the desired functions for a particular document inserter. The tables of data in the configuration PROM are provided from customer responses to a series of questions regarding the inserter configuration and the functions to be performed thereby. During operation, the software of the supervisory program will access the data tables from the configuration PROM to determine which routines of the supervisory program are to be executed. Further details regarding the operation of the supervisory program within the multi-station document inserter may be obtained by referring to the above-noted co-pending patent application entitled "UNIVERSAL MULTI-STATION DOCUMENT INSERTER", a flow chart of the supervisory program is illustrated in FIG. 7.

Figure 3:
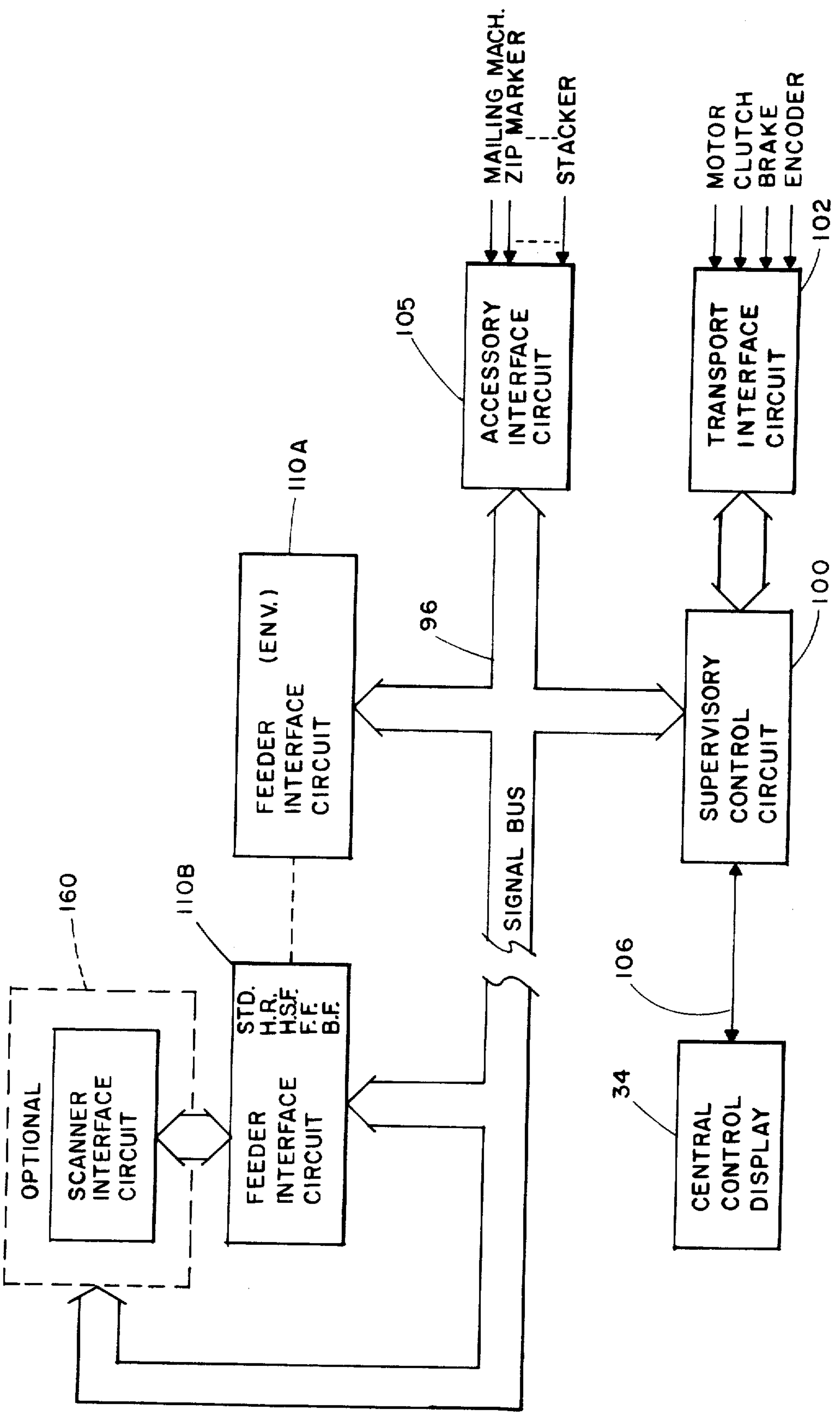
FIG. 3 is a block diagram of the electronic circuits employed with the multi-station document inserter.

Referring to FIG. 3, a block diagram of the interconnection of the interface circuits for the multi-station document inserter 40 is illustrated. The supervisory control circuit or central microprocessor 100 interacts directly with transport interface circuit 102 to activate the transport motor, clutch and brake, as well as receive pulses from the encoder 198 (see FIG. 2, for control of the transport deck 30 (see FIG. 1). Interactive communication between the supervisory control circuit 100 and the central control display 34 is provided over the standard communication line 106. Advantageously, the central control display 34 is a finger touch display switch. Communication between the supervisory circuit 100 and the feeder interface circuits 110B for documents and envelope interface circuits 110A for envelopes and accessory interface circuit 105 is maintained over the signal bus 96. Additionally, the supervisory control circuit 100 communicates with the scanner interface circuit 160 through the signal bus 96. The scanner interface circuit 160 also communicates with the feeder interface circuit 110B. The scanner interface circuit 160 is described in more detail in the above-noted copending application entitled "SCANNER INTERFACE CIRCUIT FOR UNIVERSAL MULTI-STATION DOCUMENT INSERTER".

Figures 4, 4A:
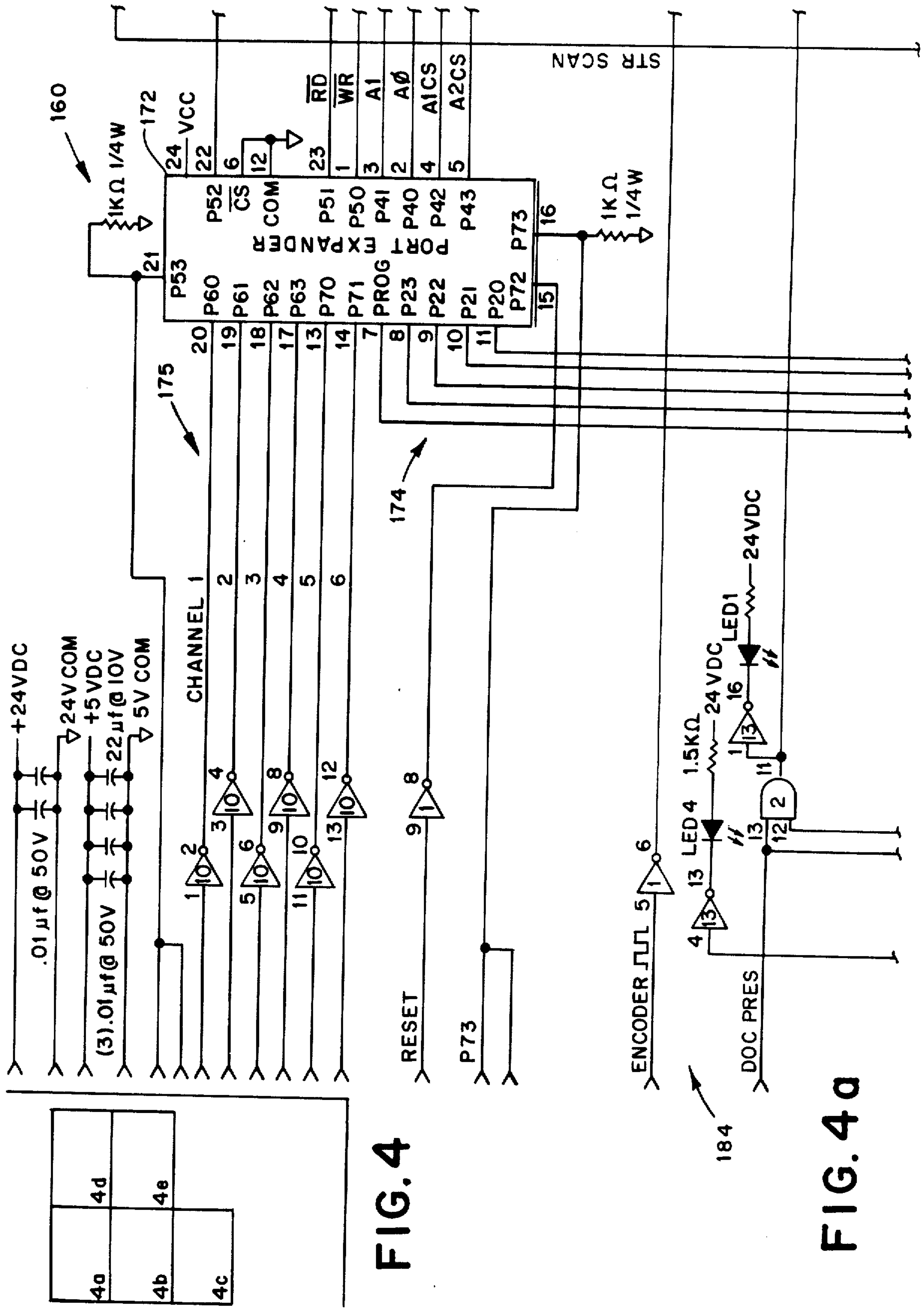
FIGS. 4*a*–4*e* are schematic diagrams of the scanner interface circuit according to the present invention.
Figure 4B:
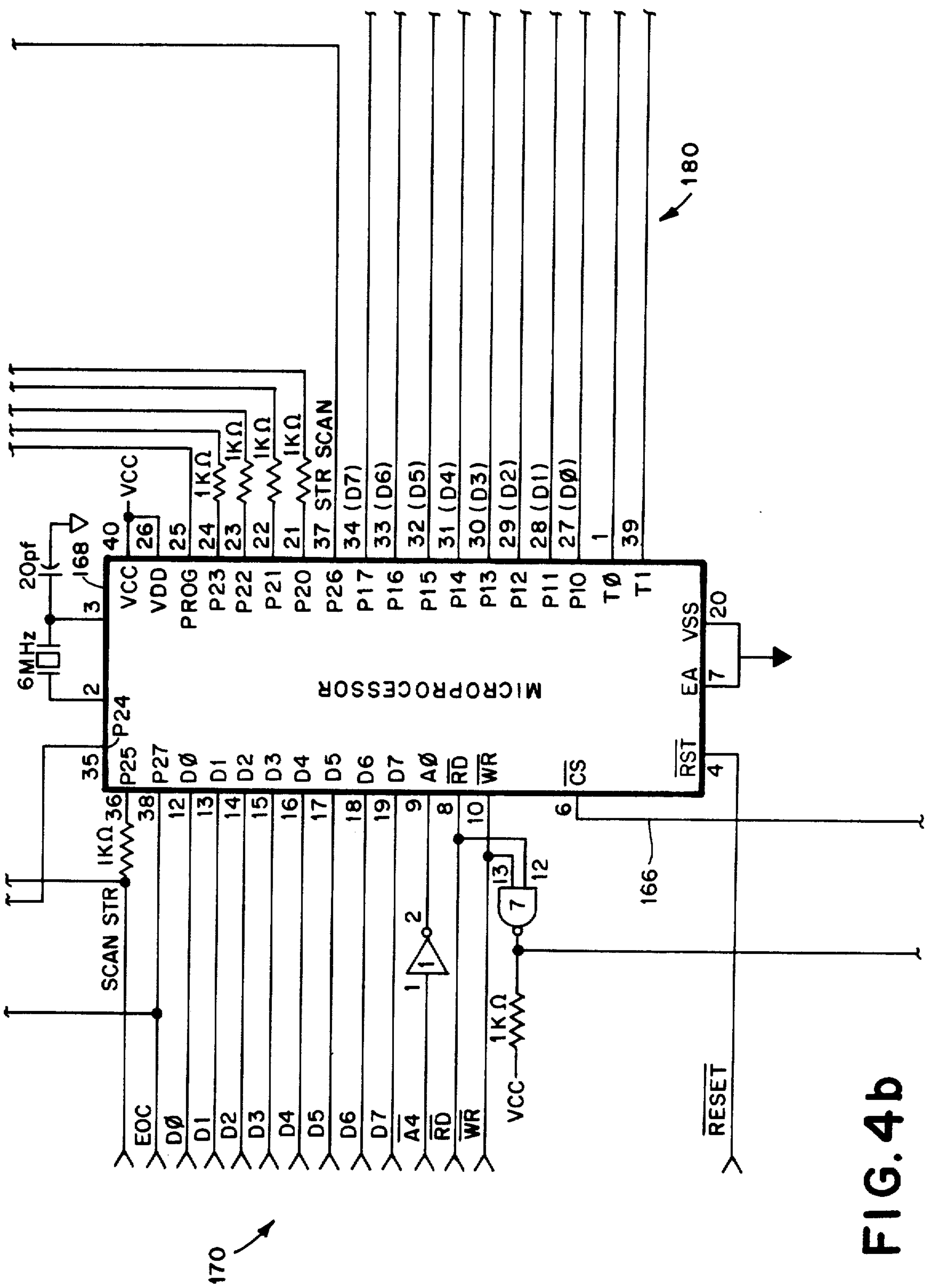
Figure 4C:
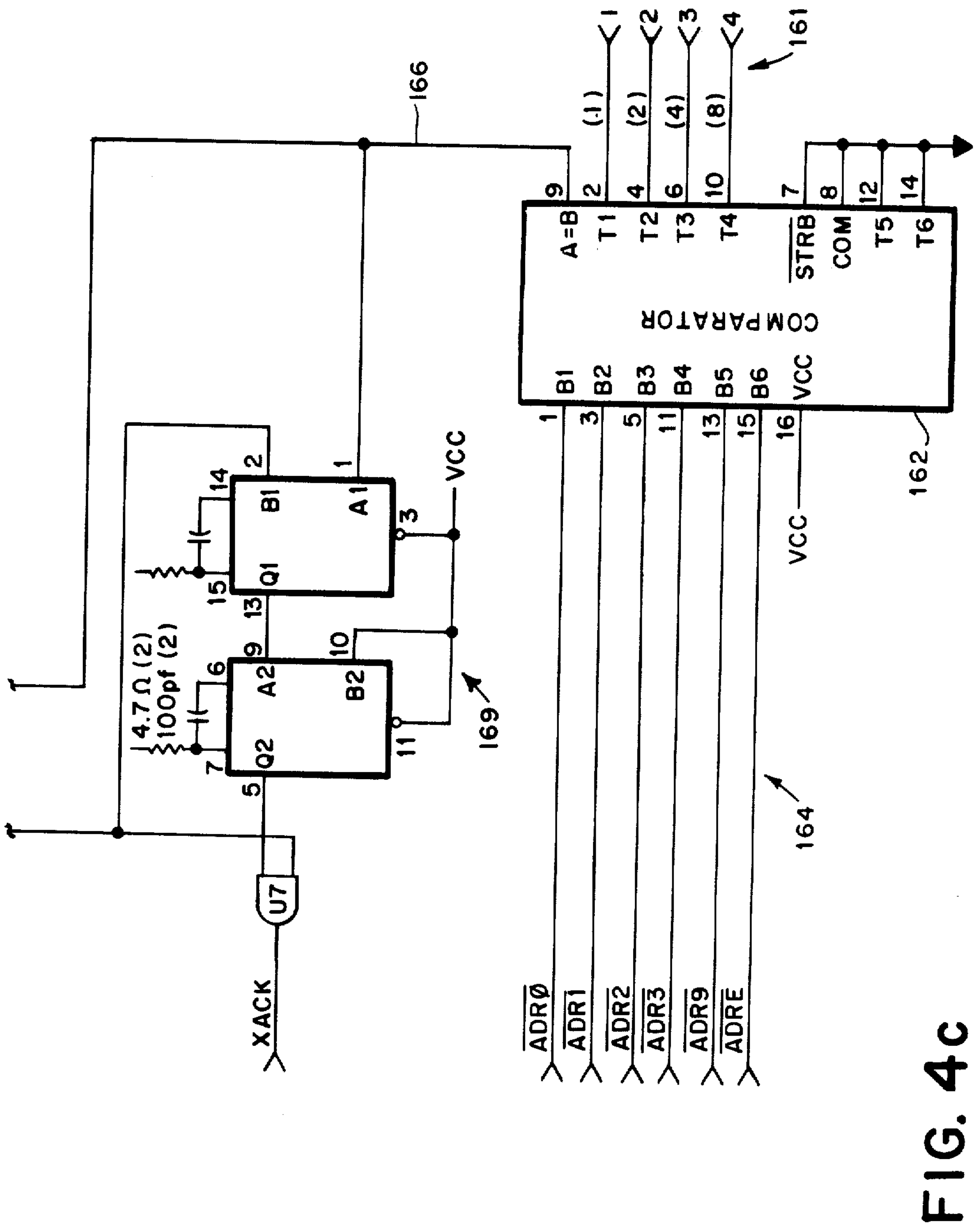
Figure 4D:
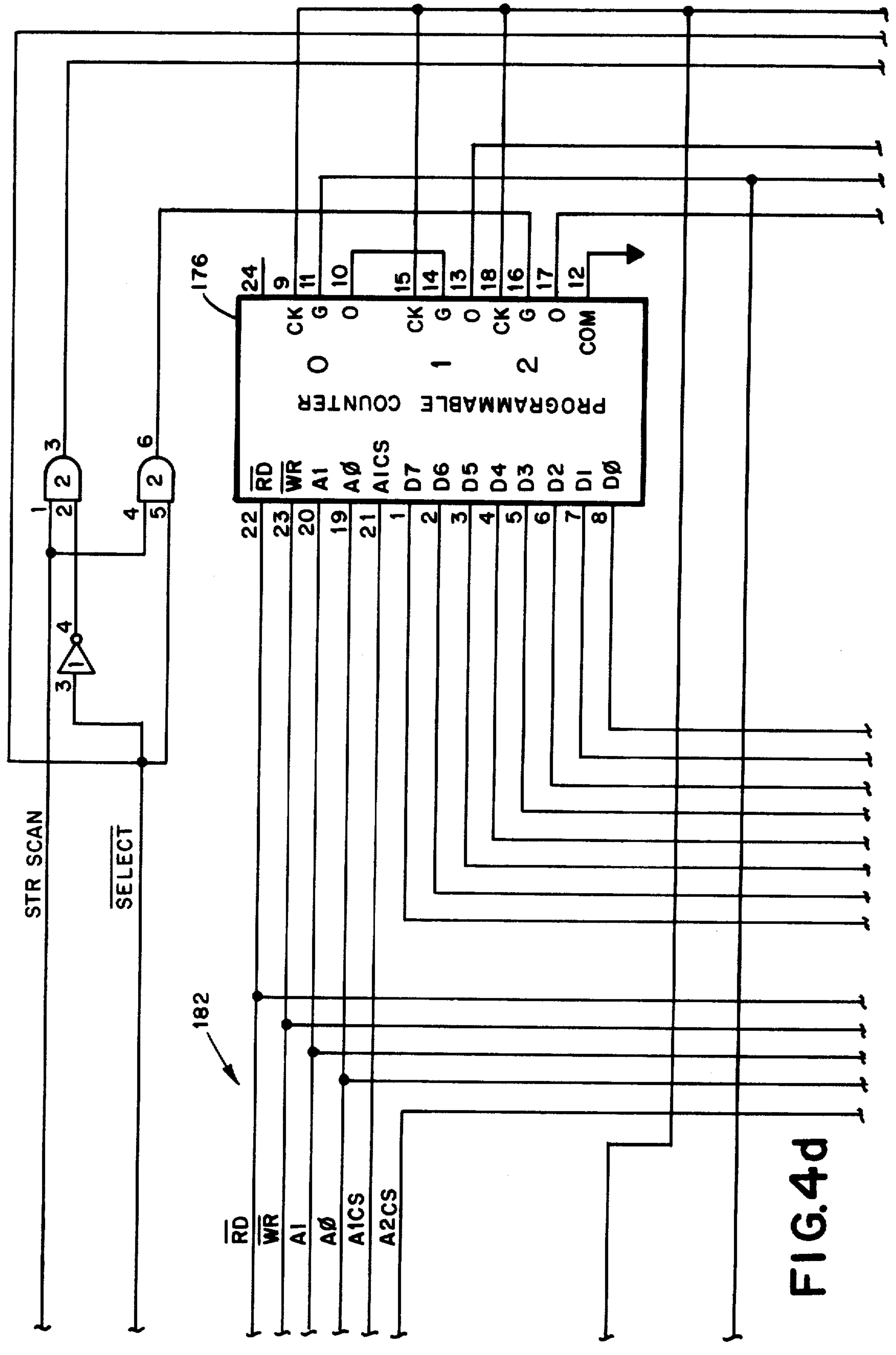
Figure 4E:
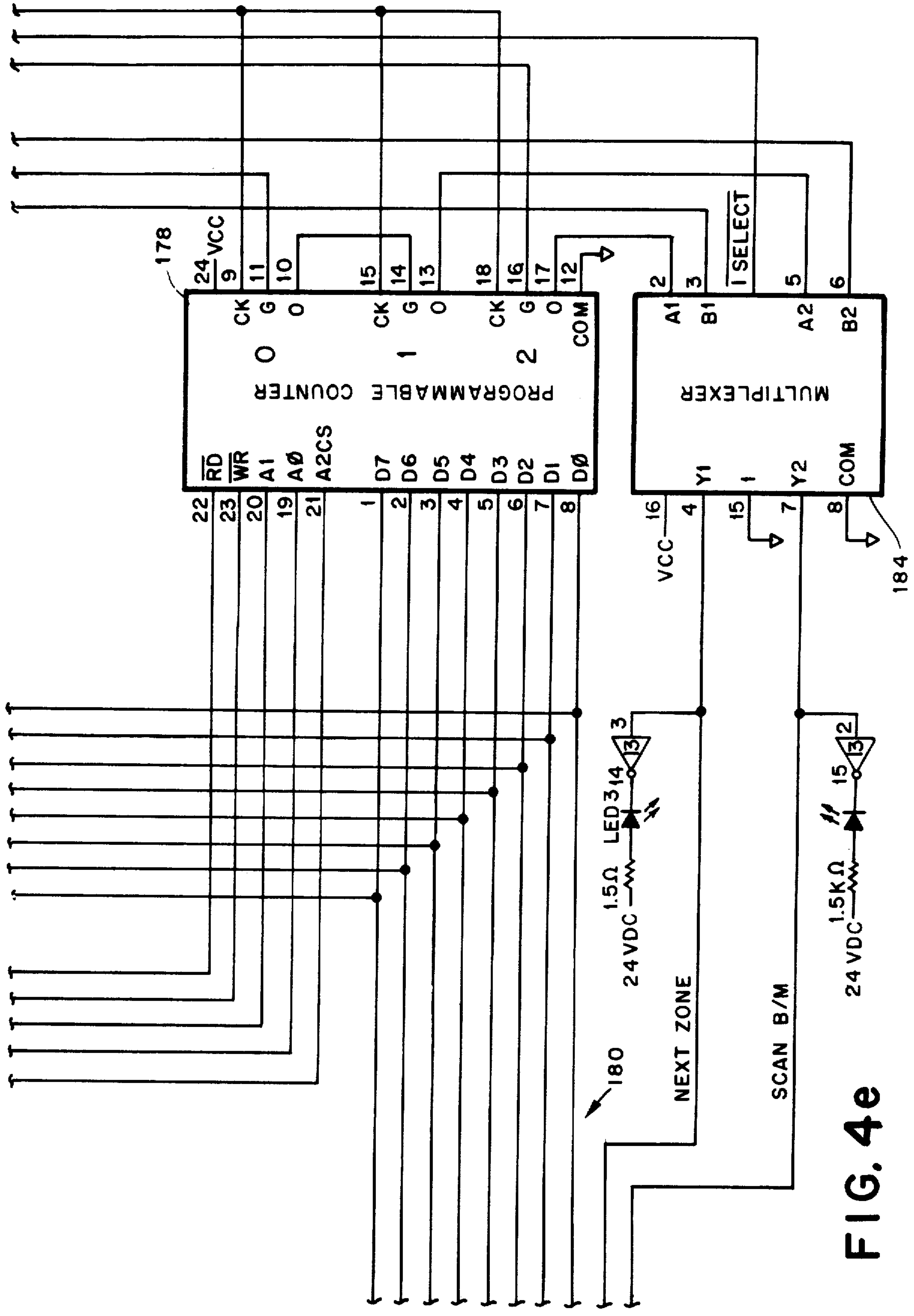
Figure 5A:
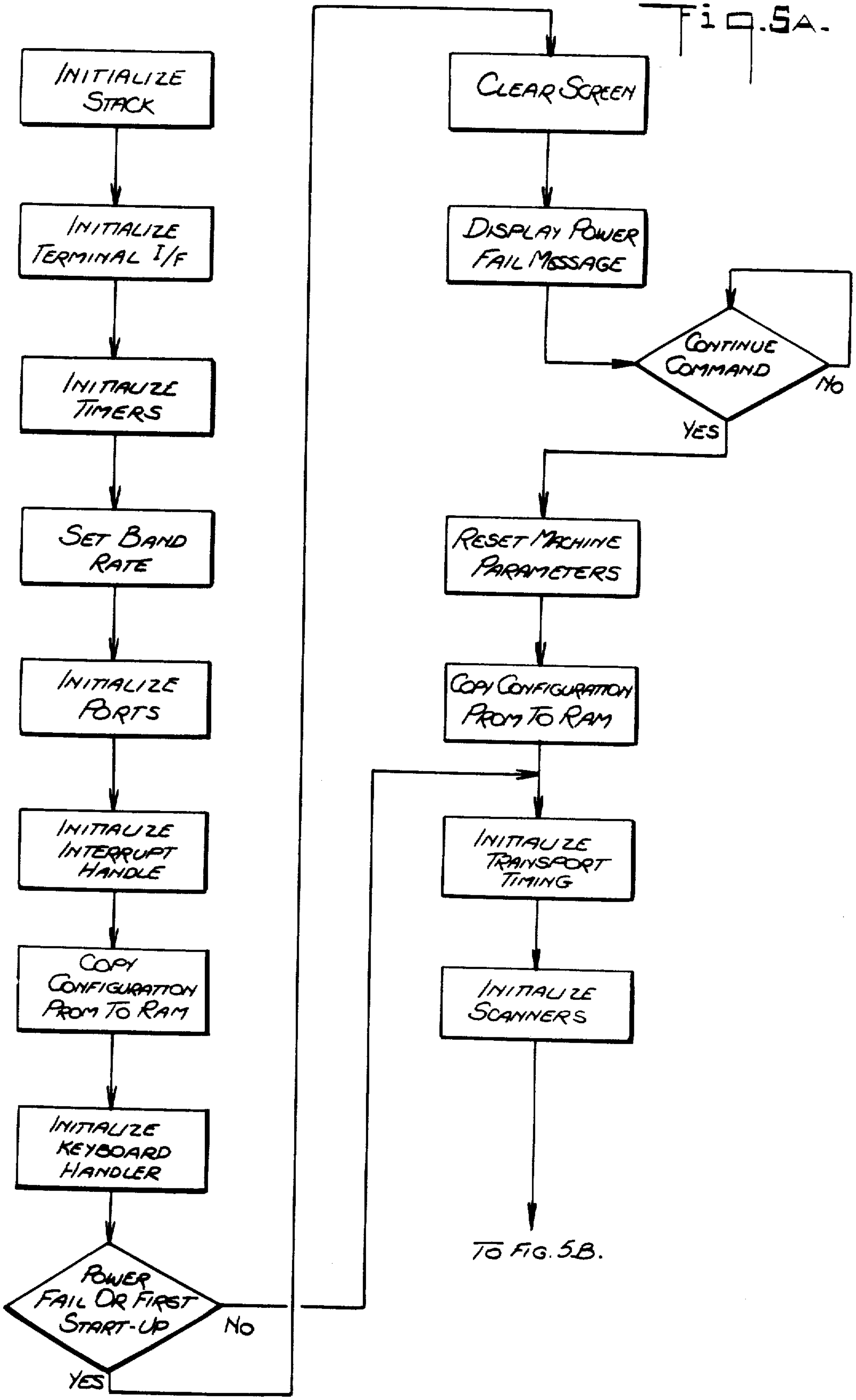
Figure 5B:
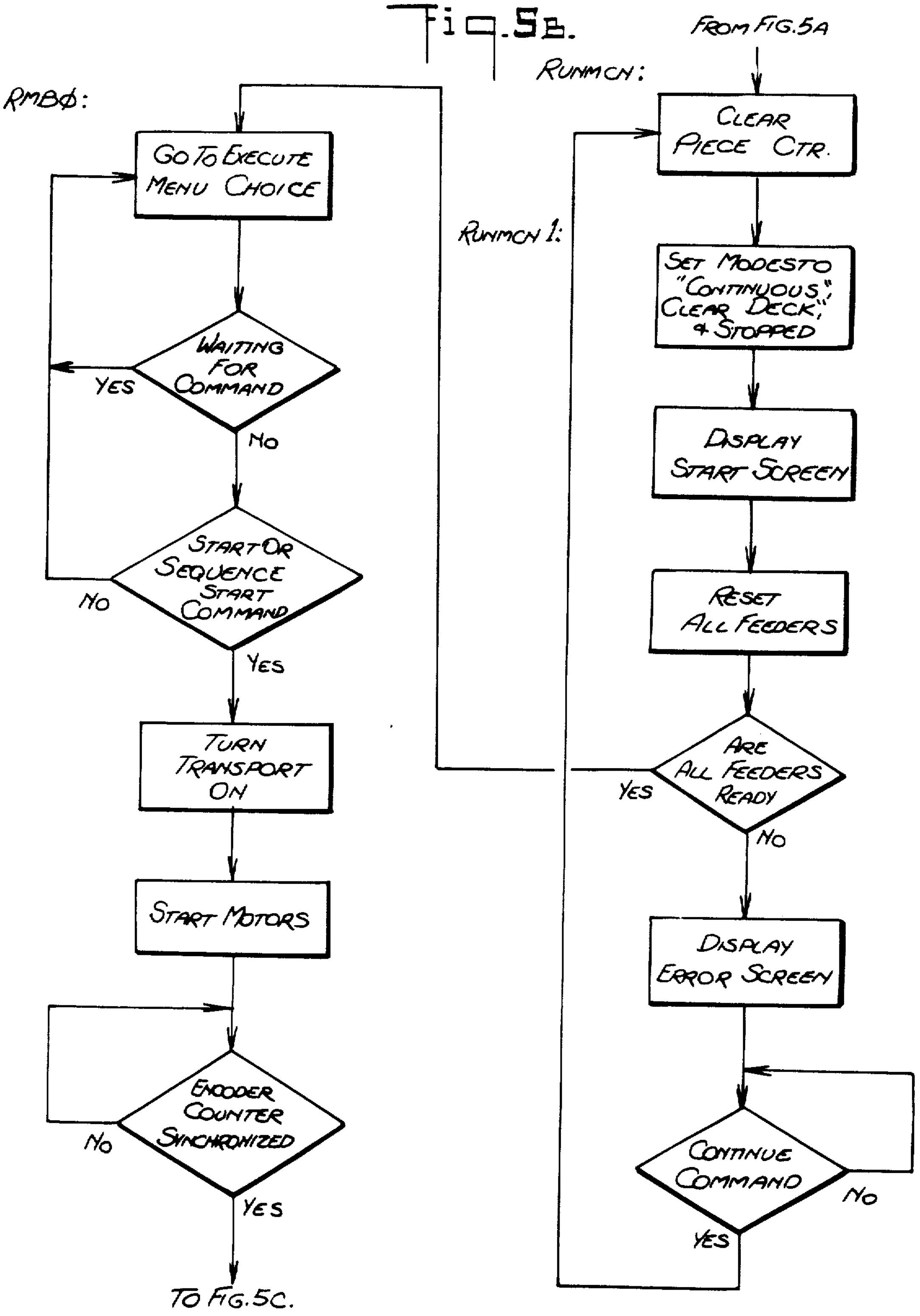
Figure 5C:
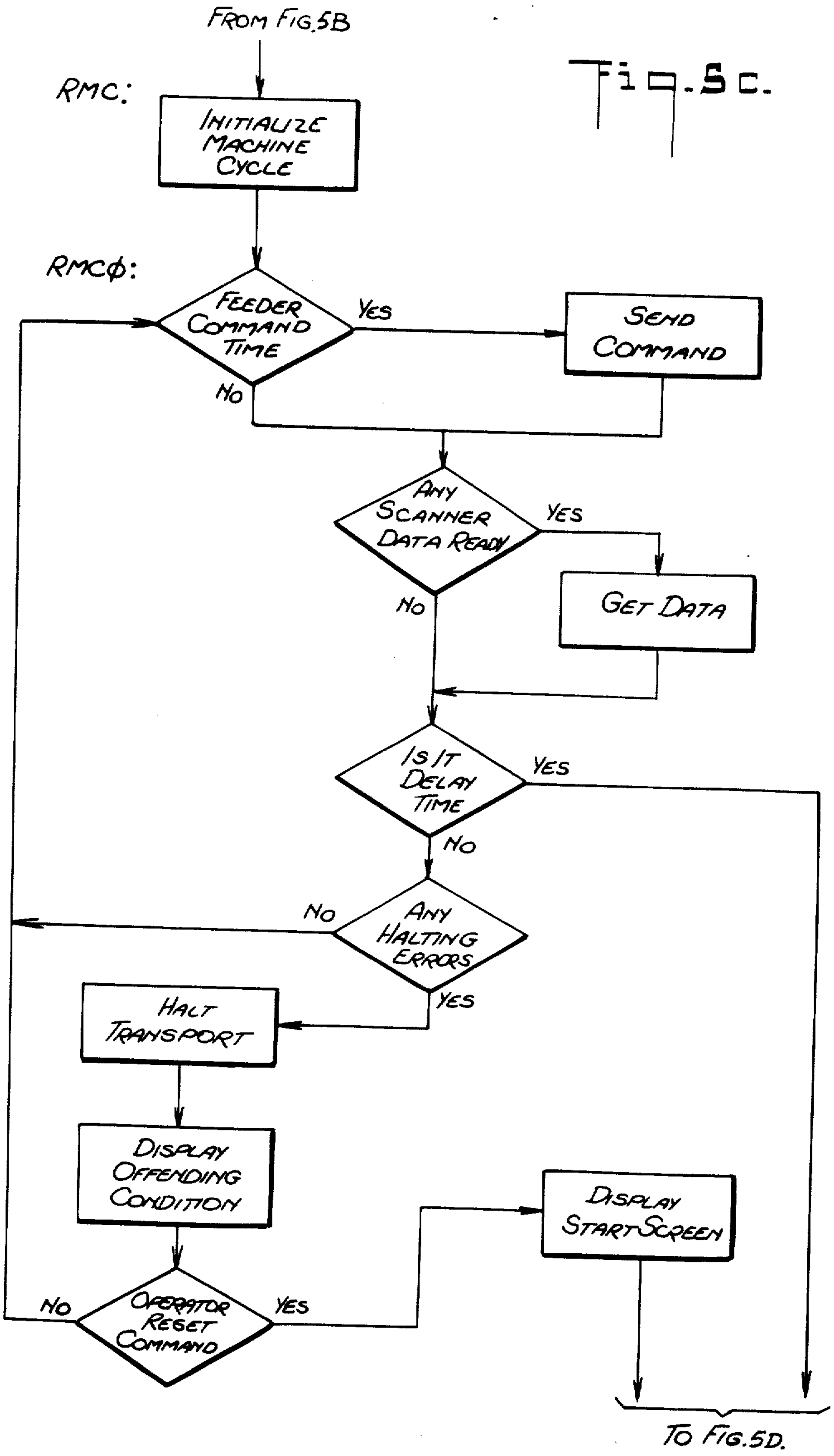
Figure 5D:
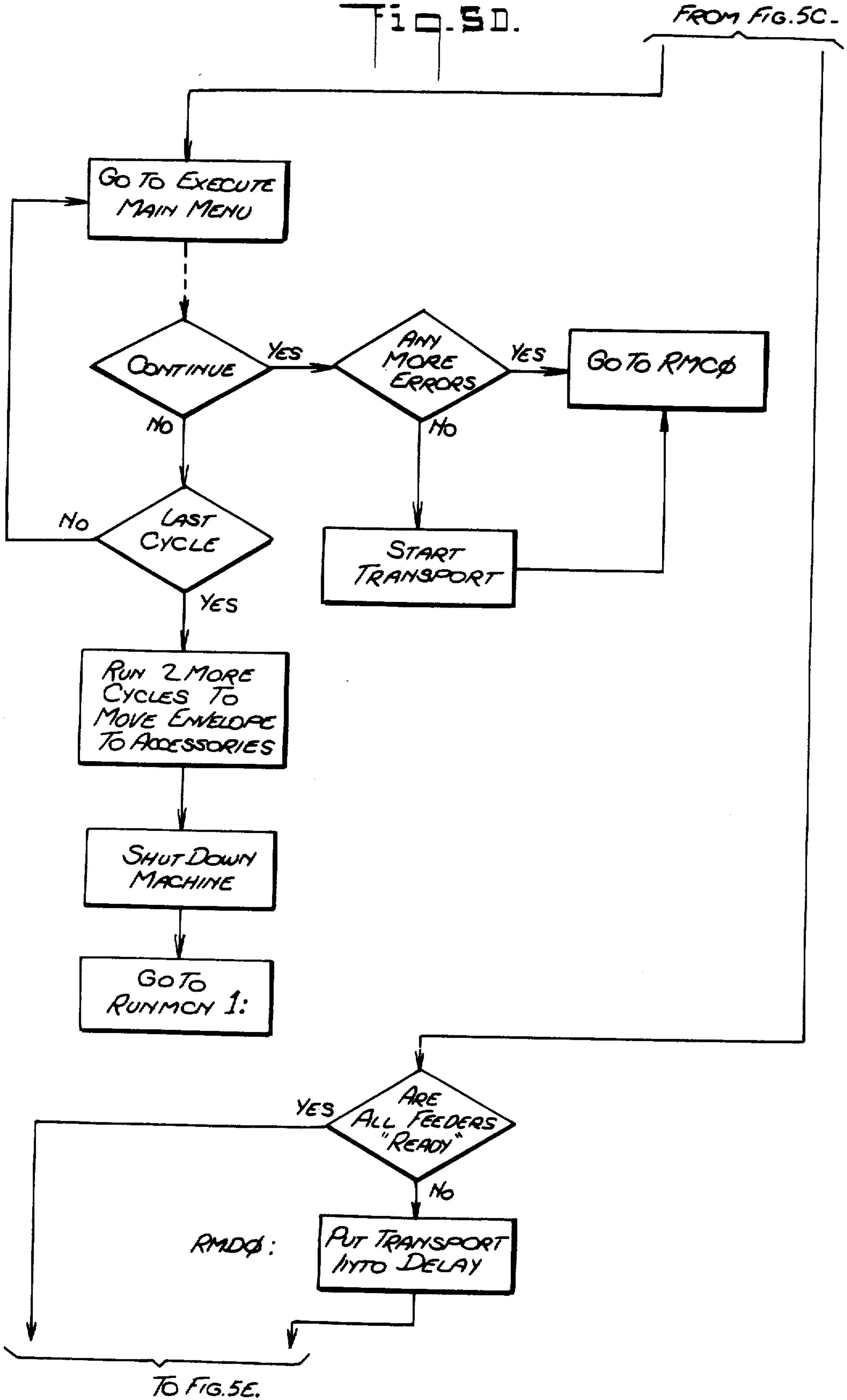
Figure 5E:
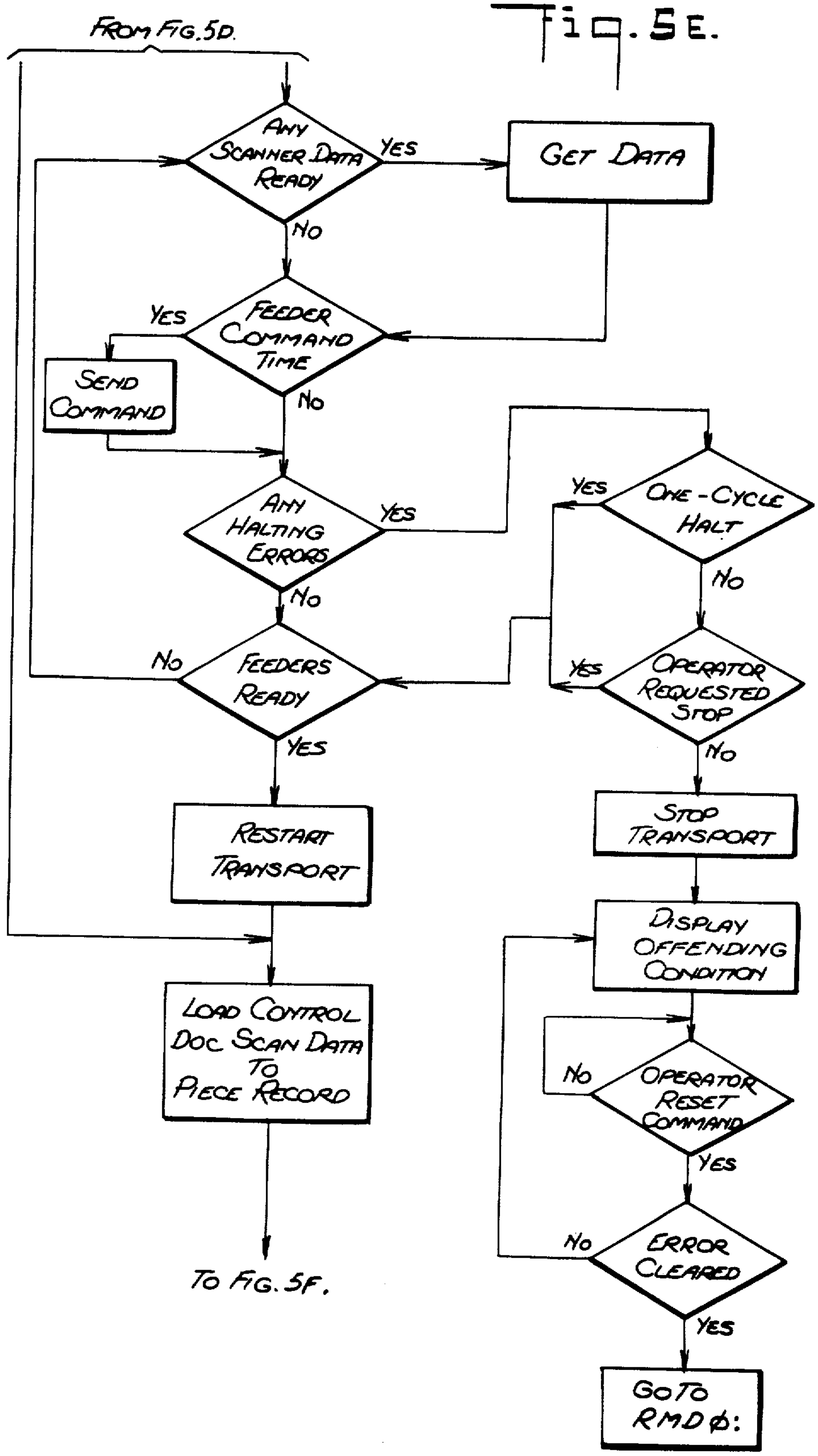
Figure 5F:
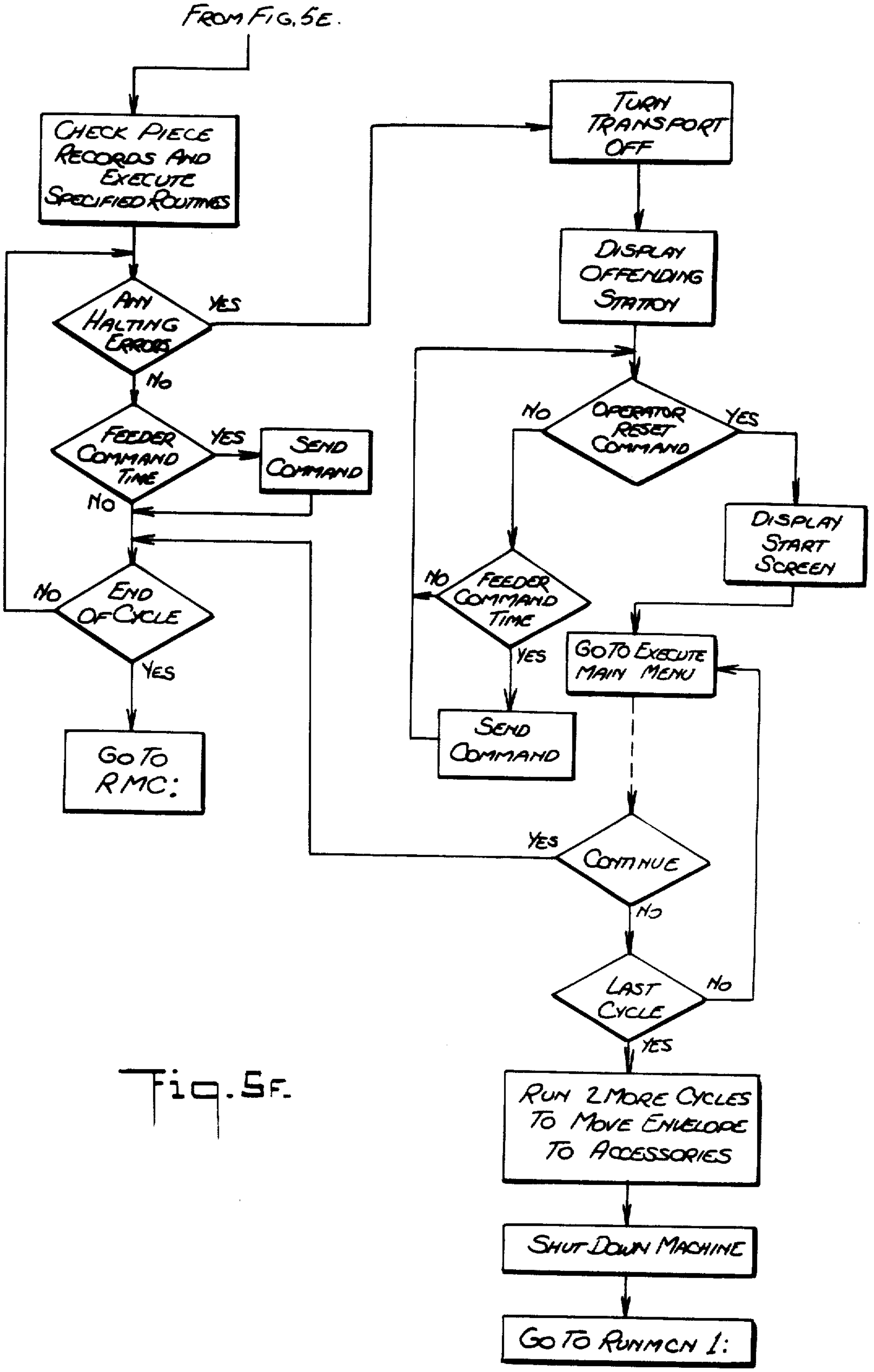
Figure 5G:
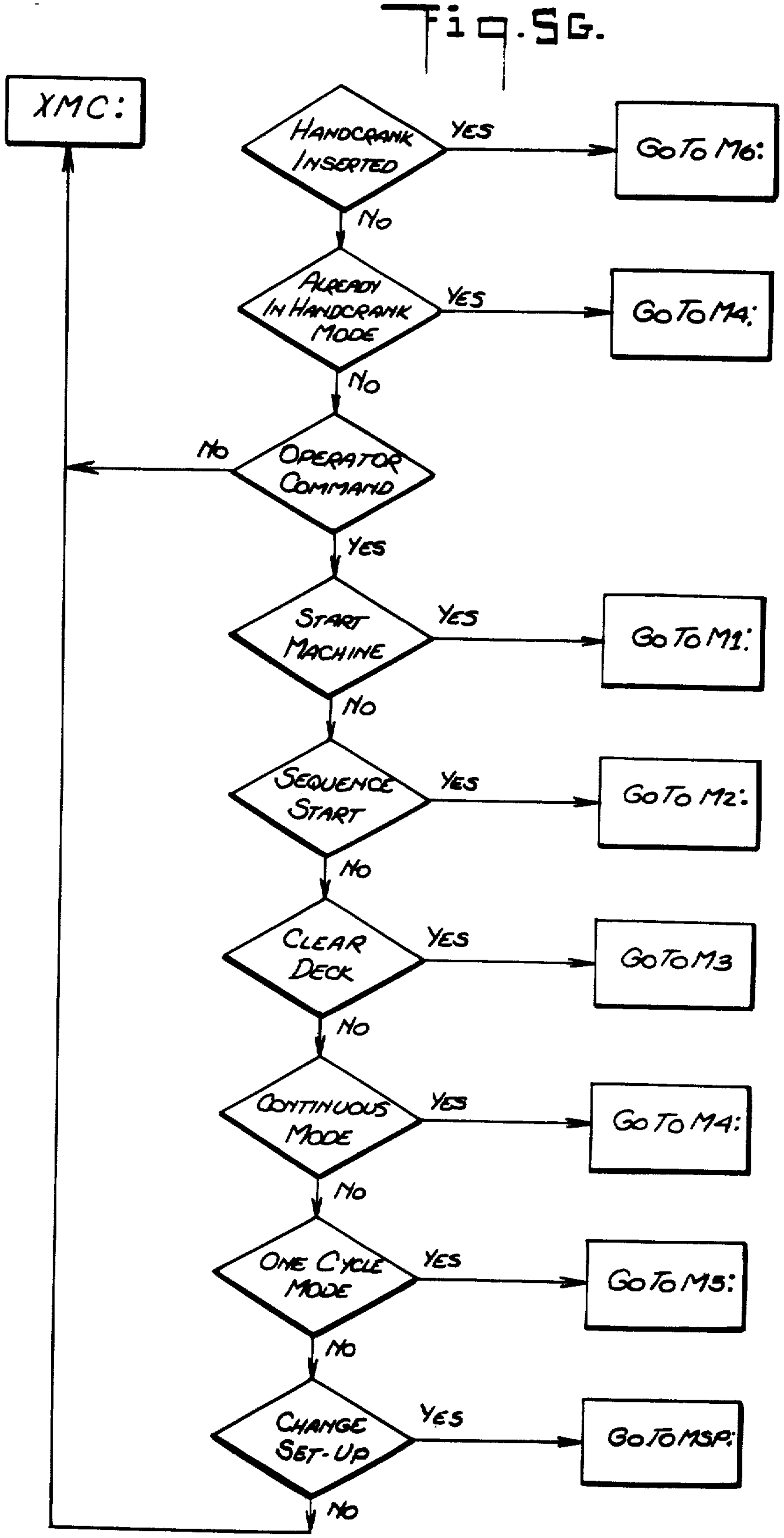
Figure 5H:
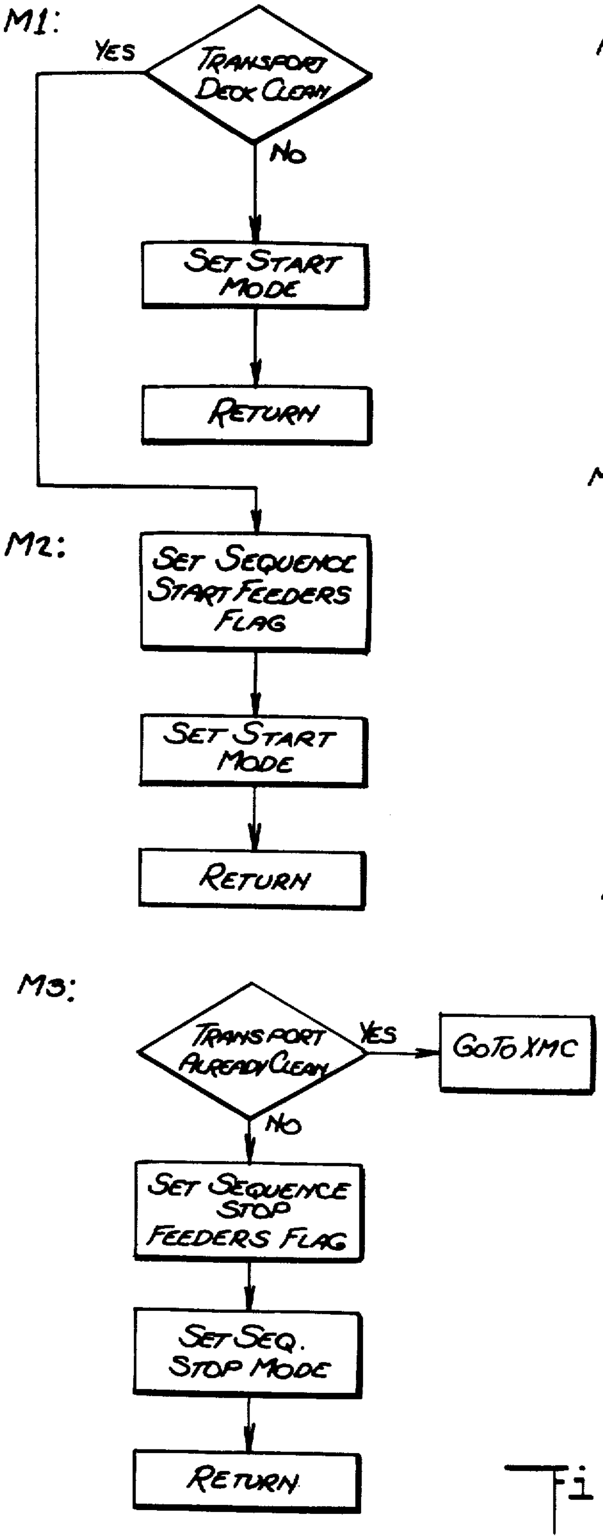
Figure 5J:
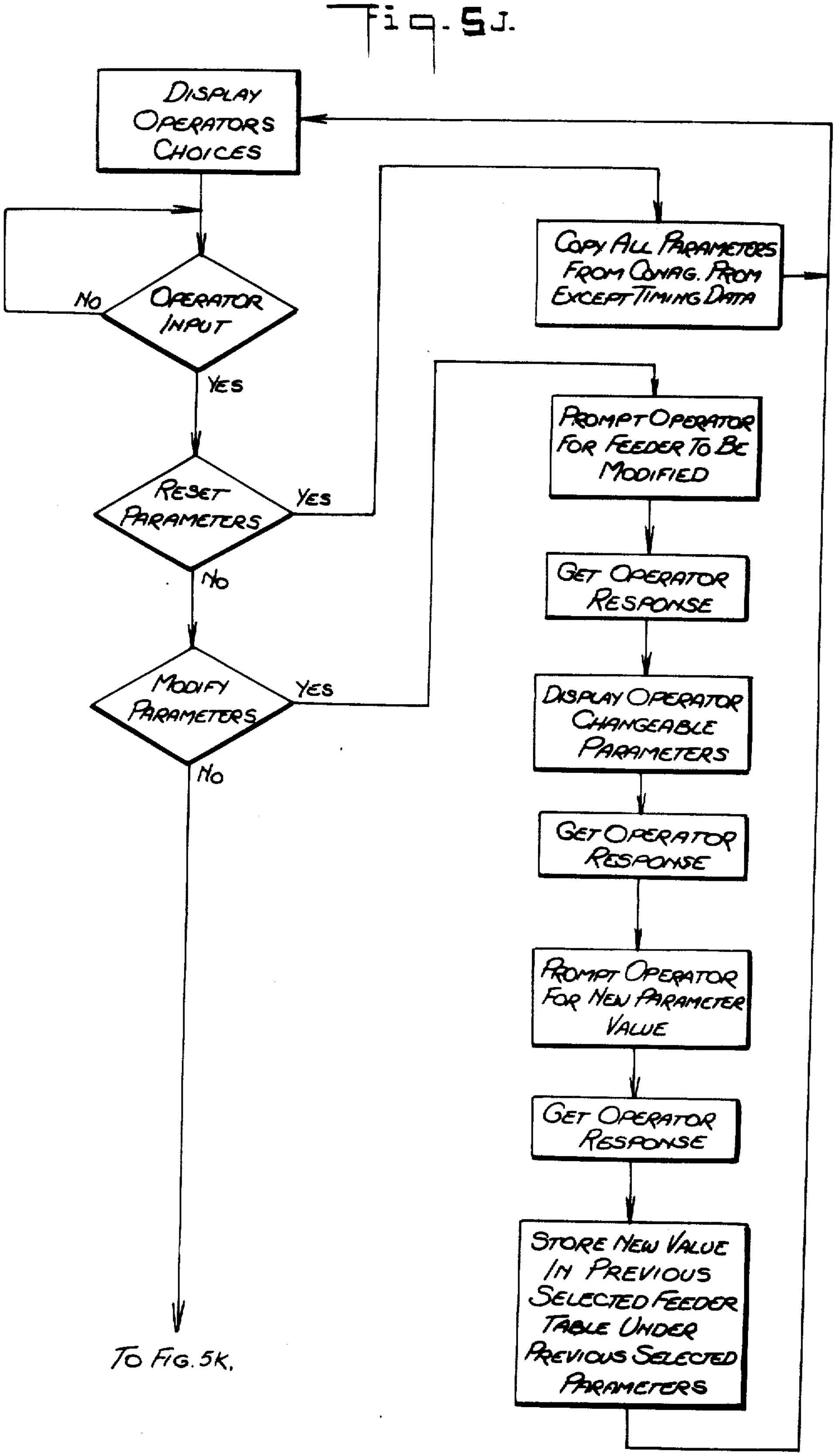
Figure 5L:
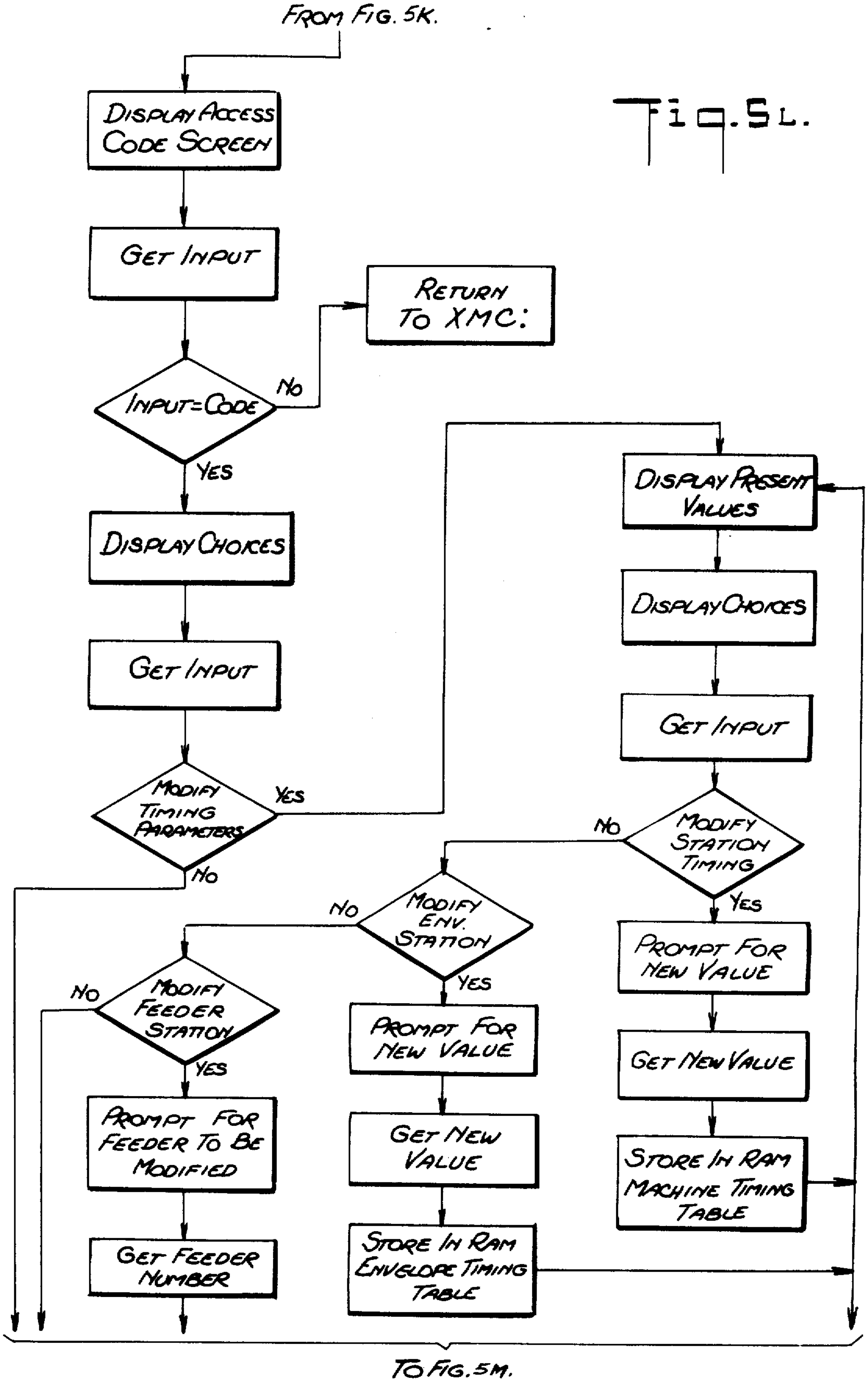
Figure 5M:
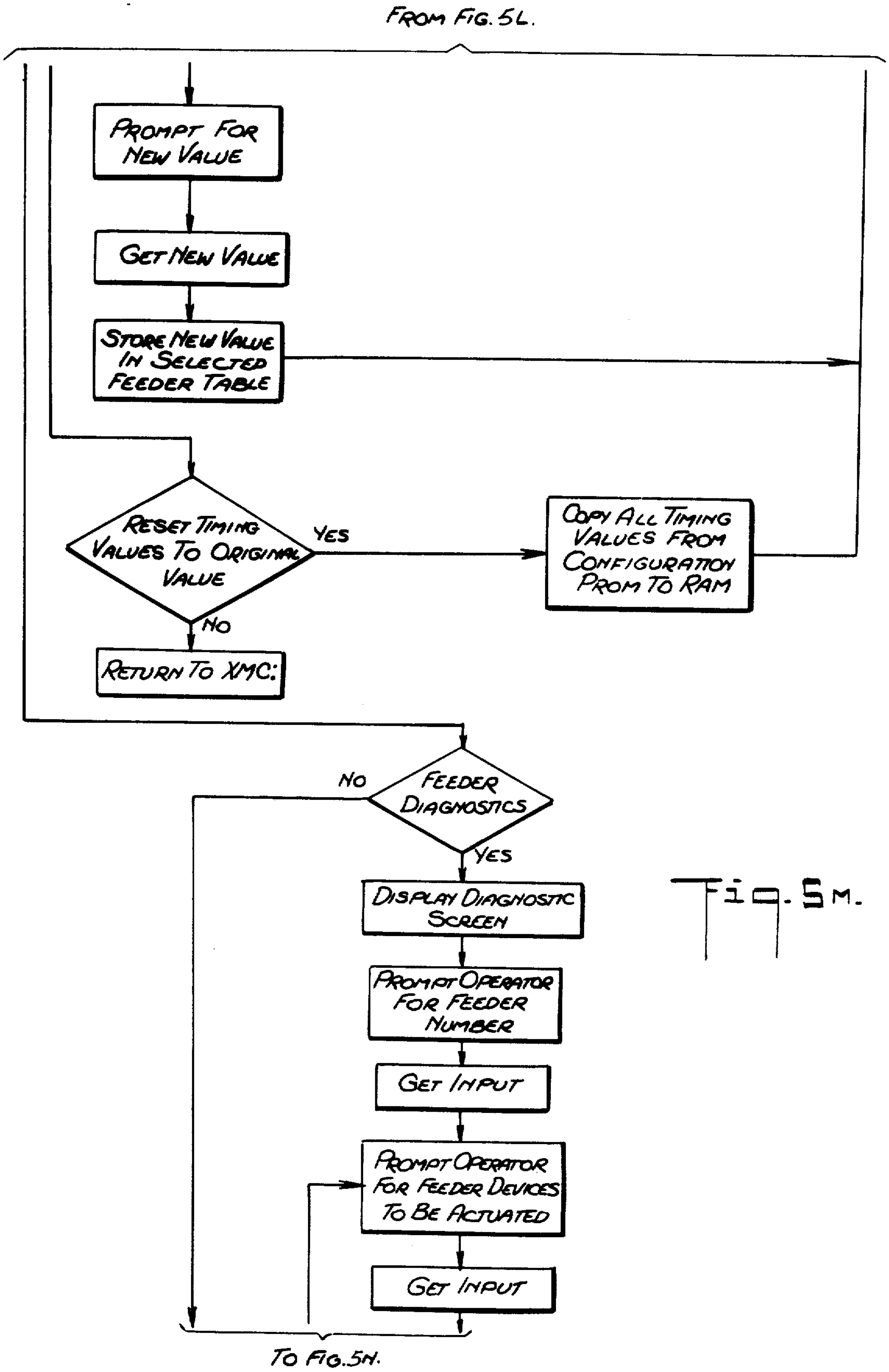
Figure 5N:
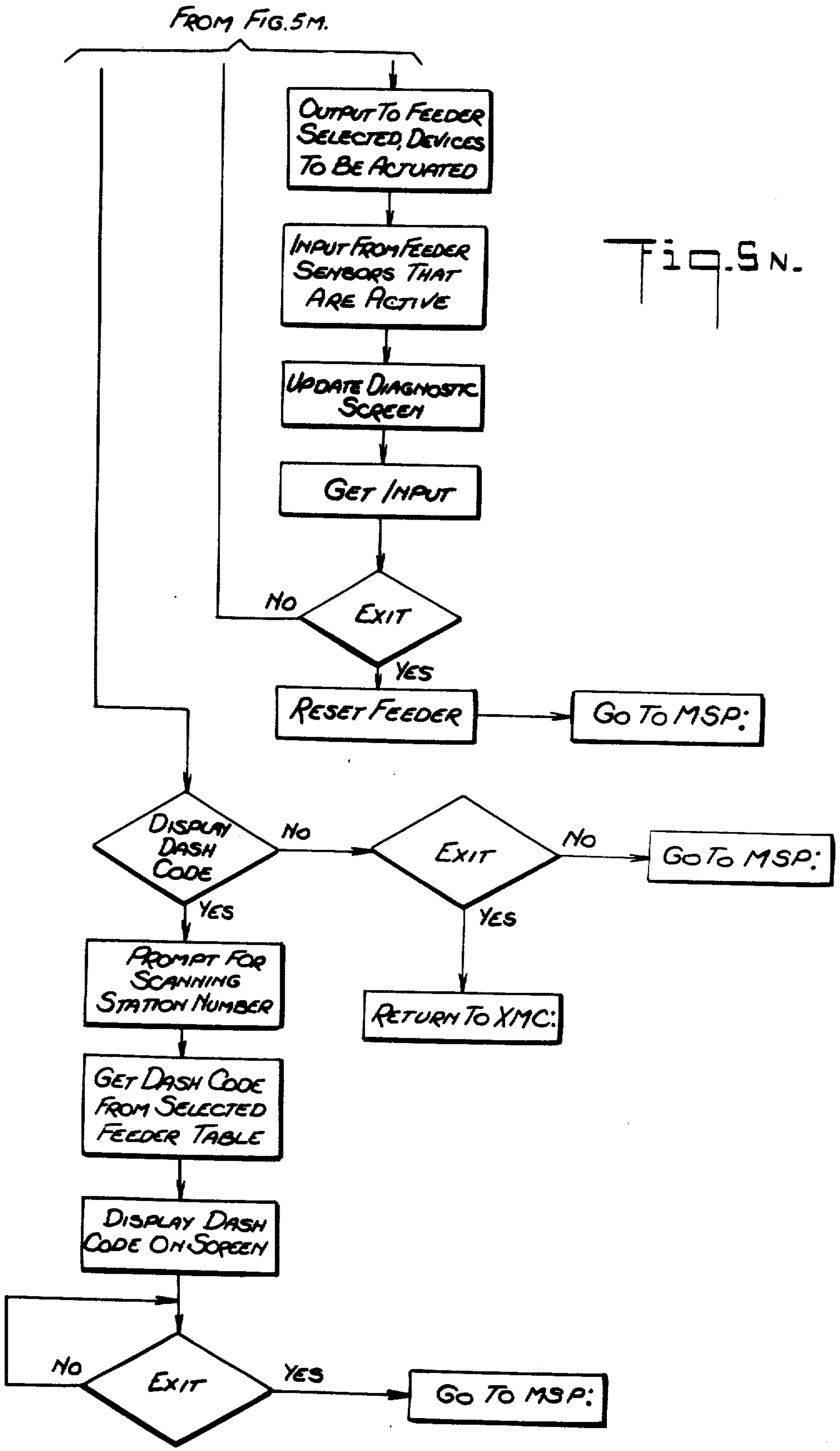
Figure 6B:
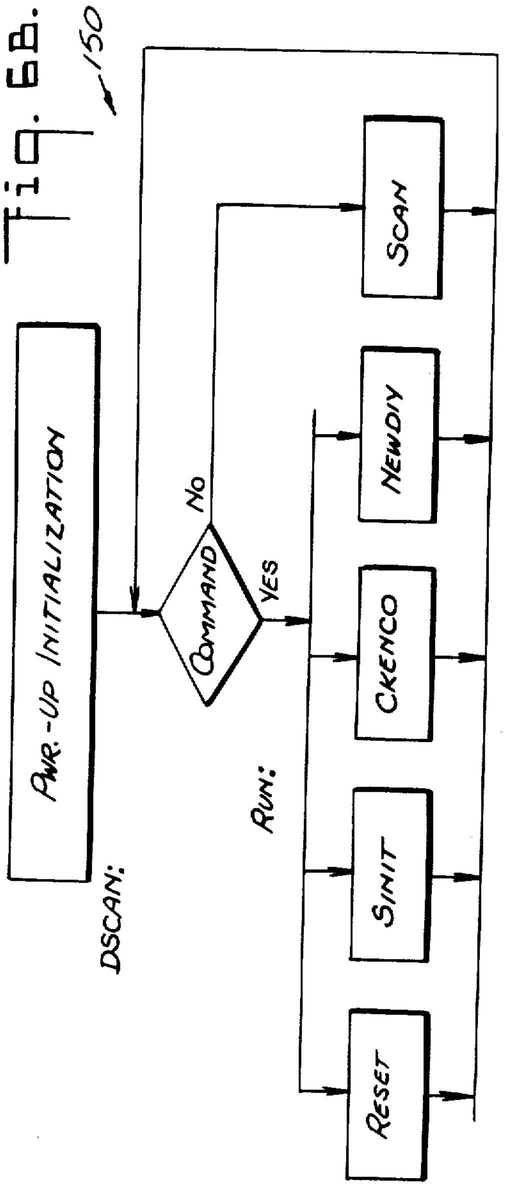
Figure 6C:
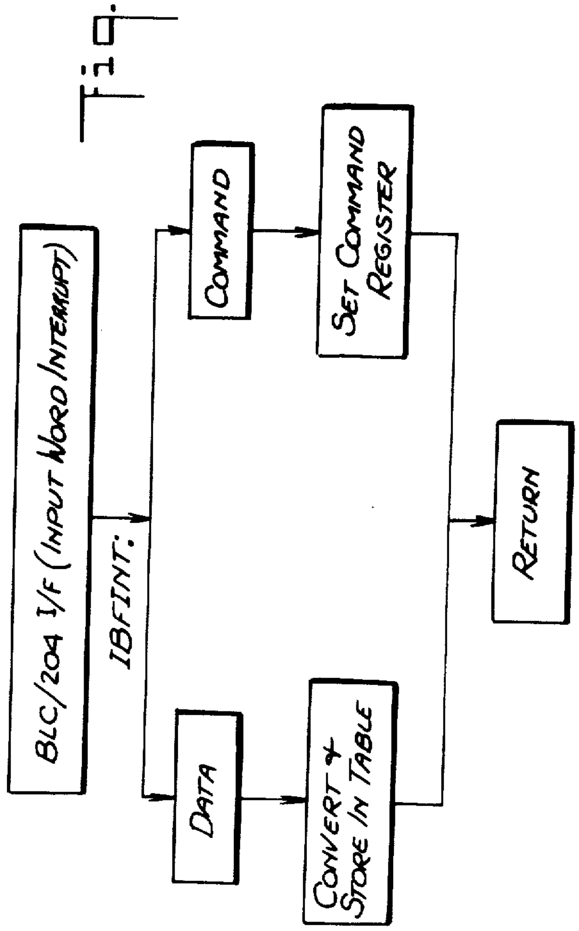
Figure 6A:
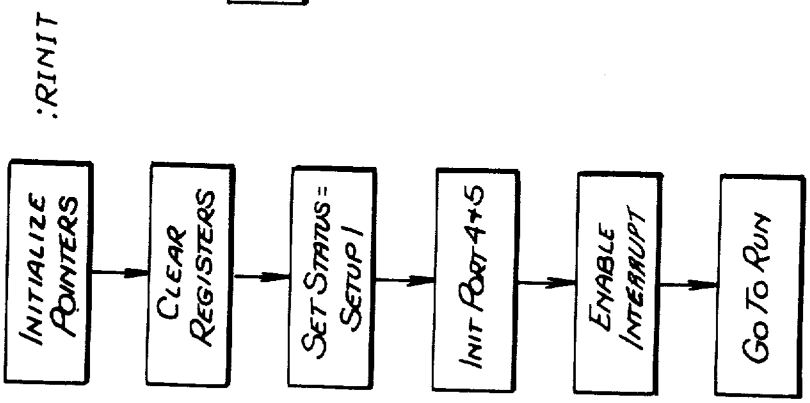
Figure 6D:
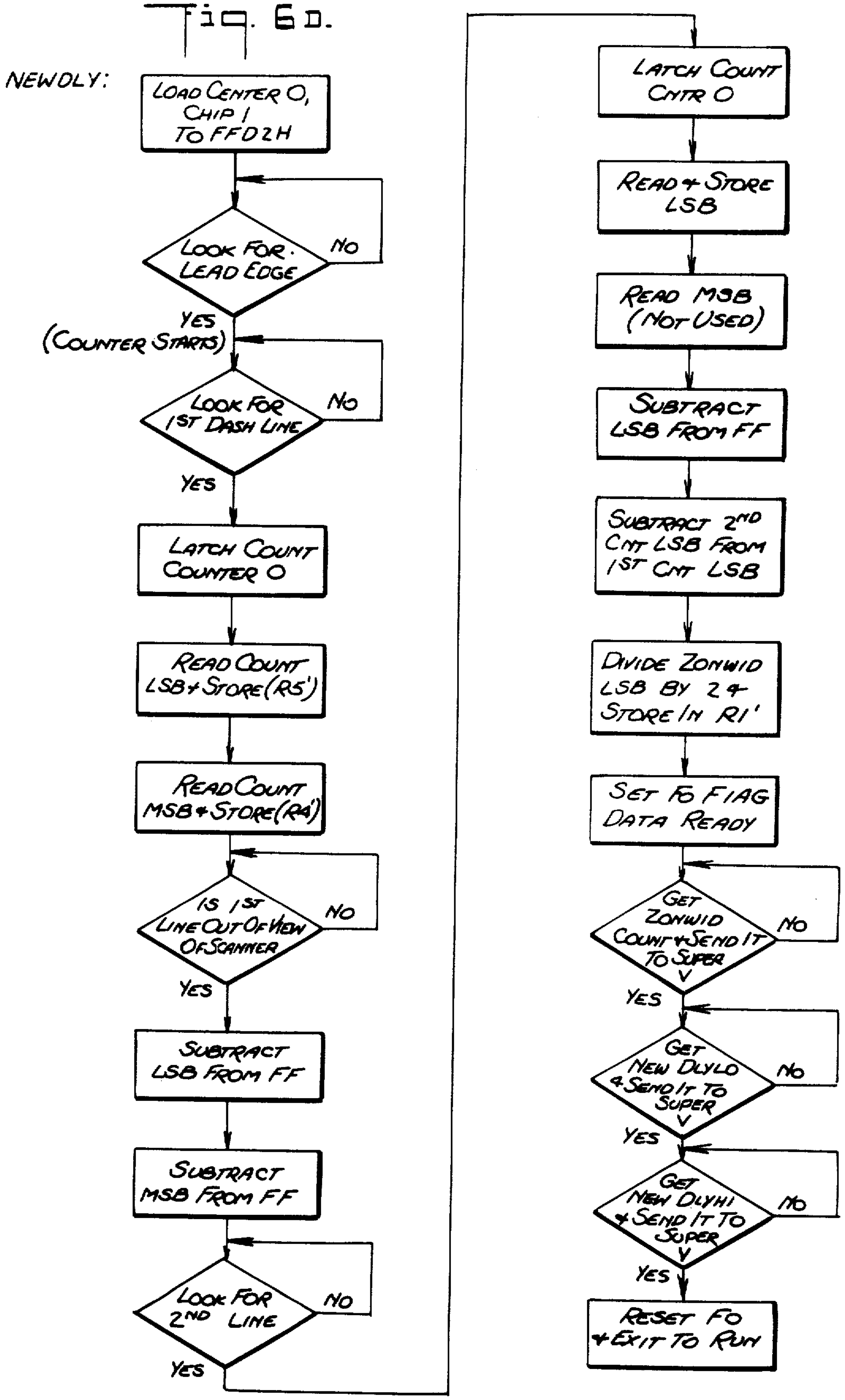
Figure 6E:
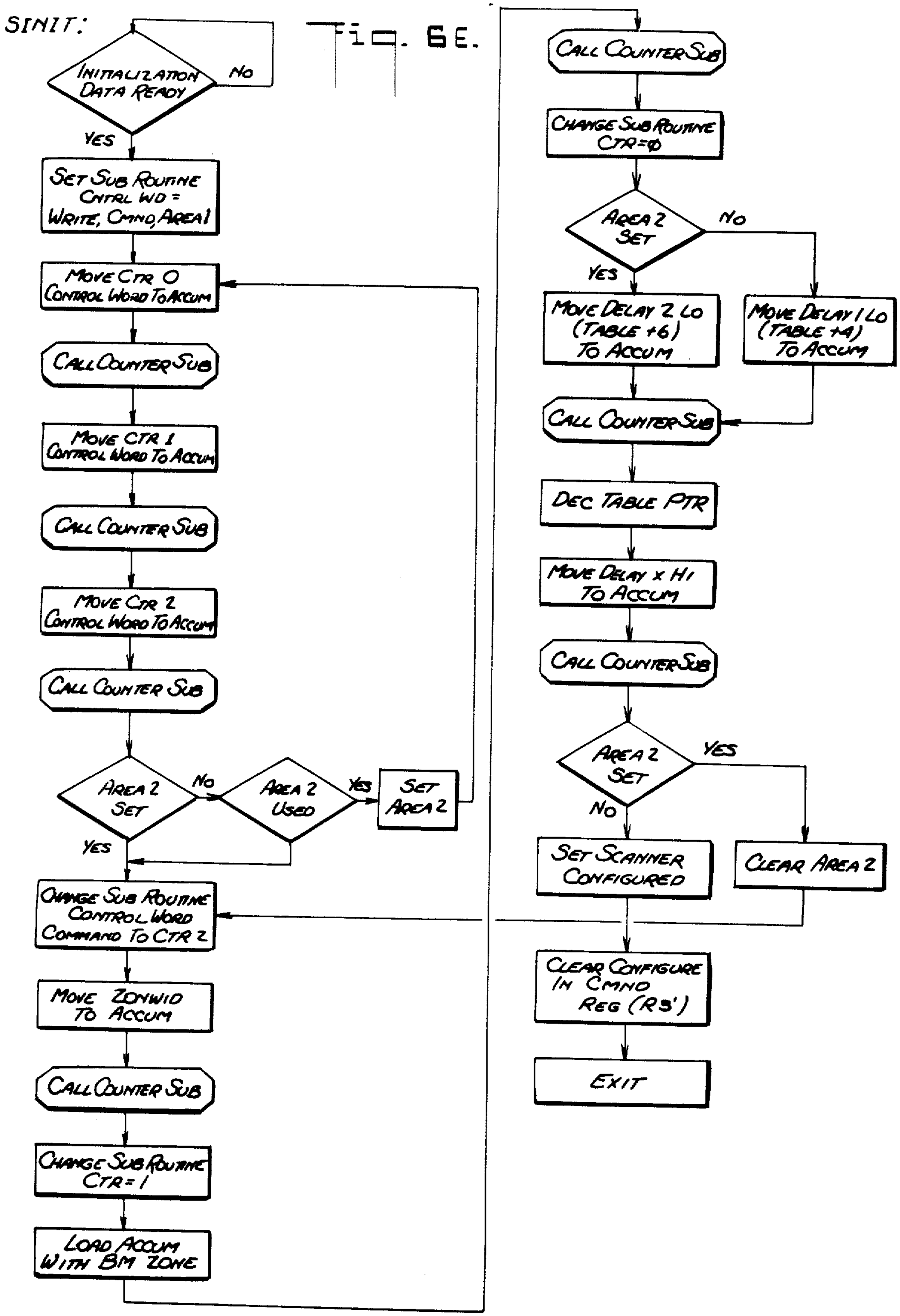
Figure 6H:
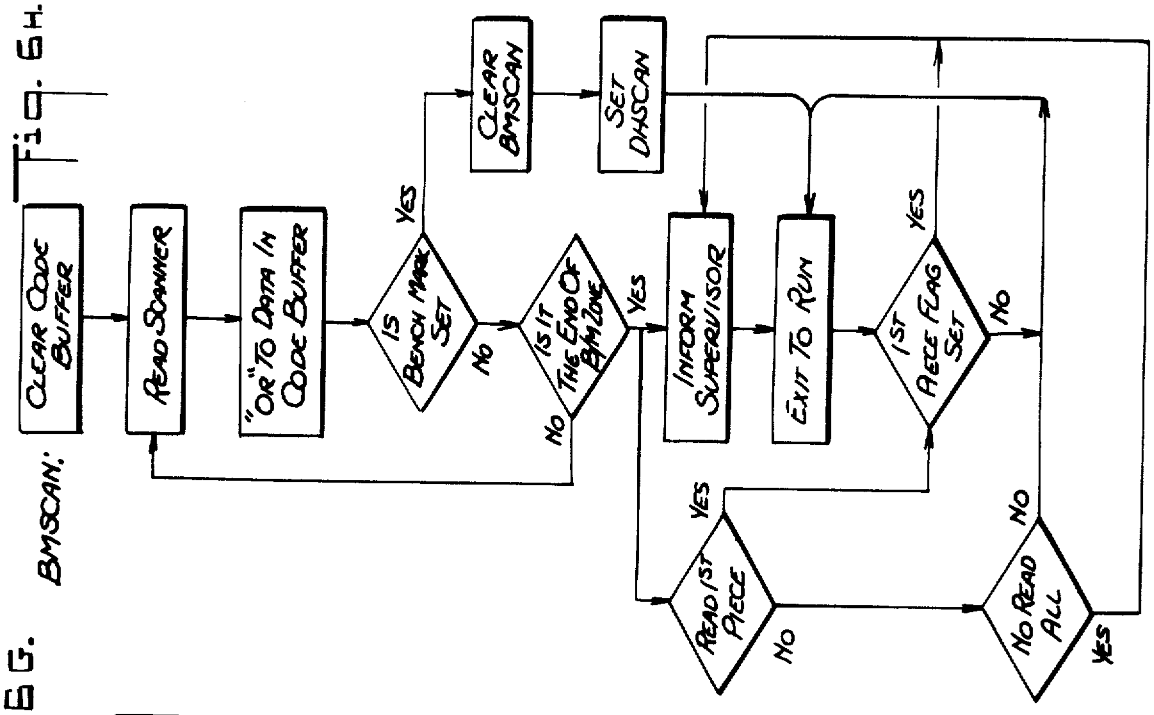
Figure 6G:
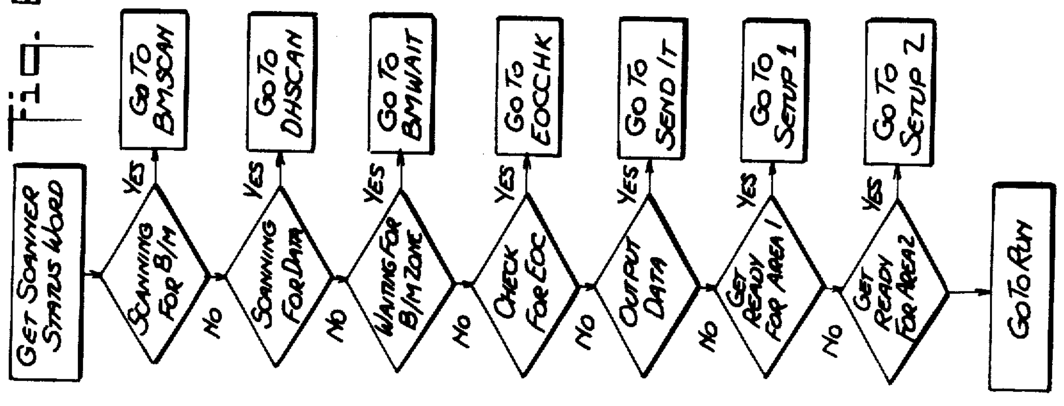
Figure 6F:
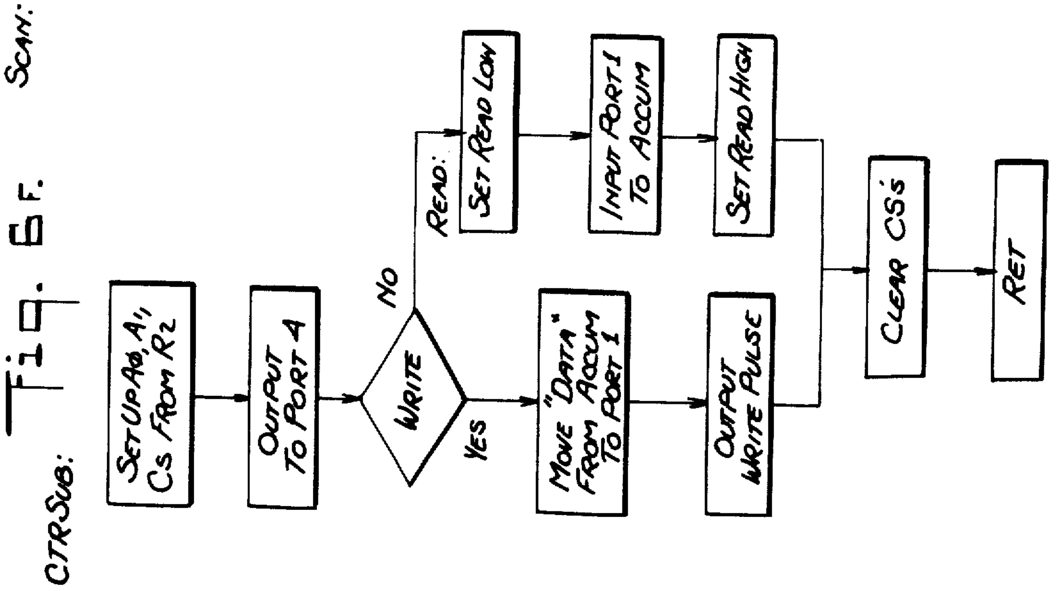
Figure 6J:
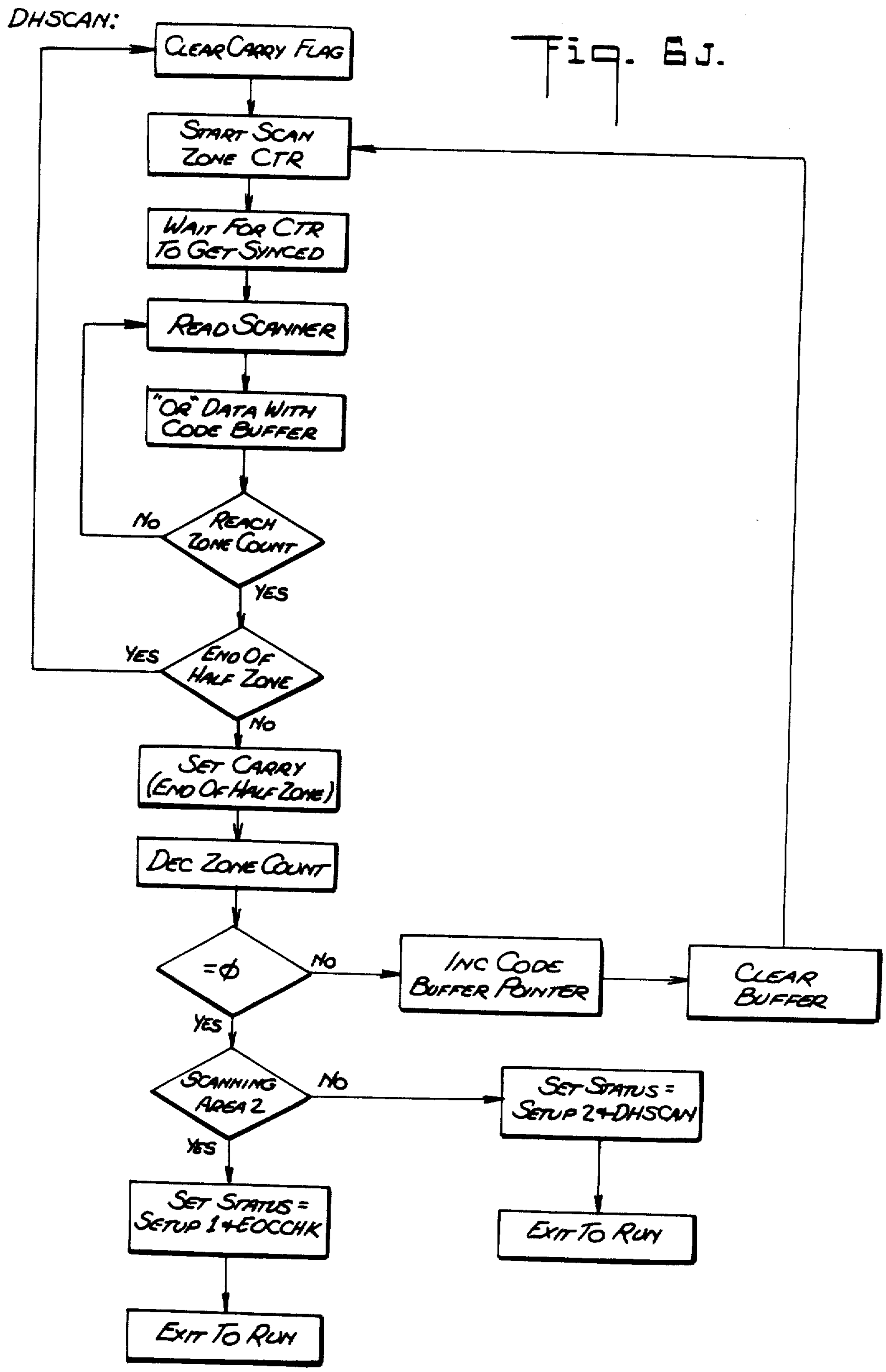
Figure 6M:
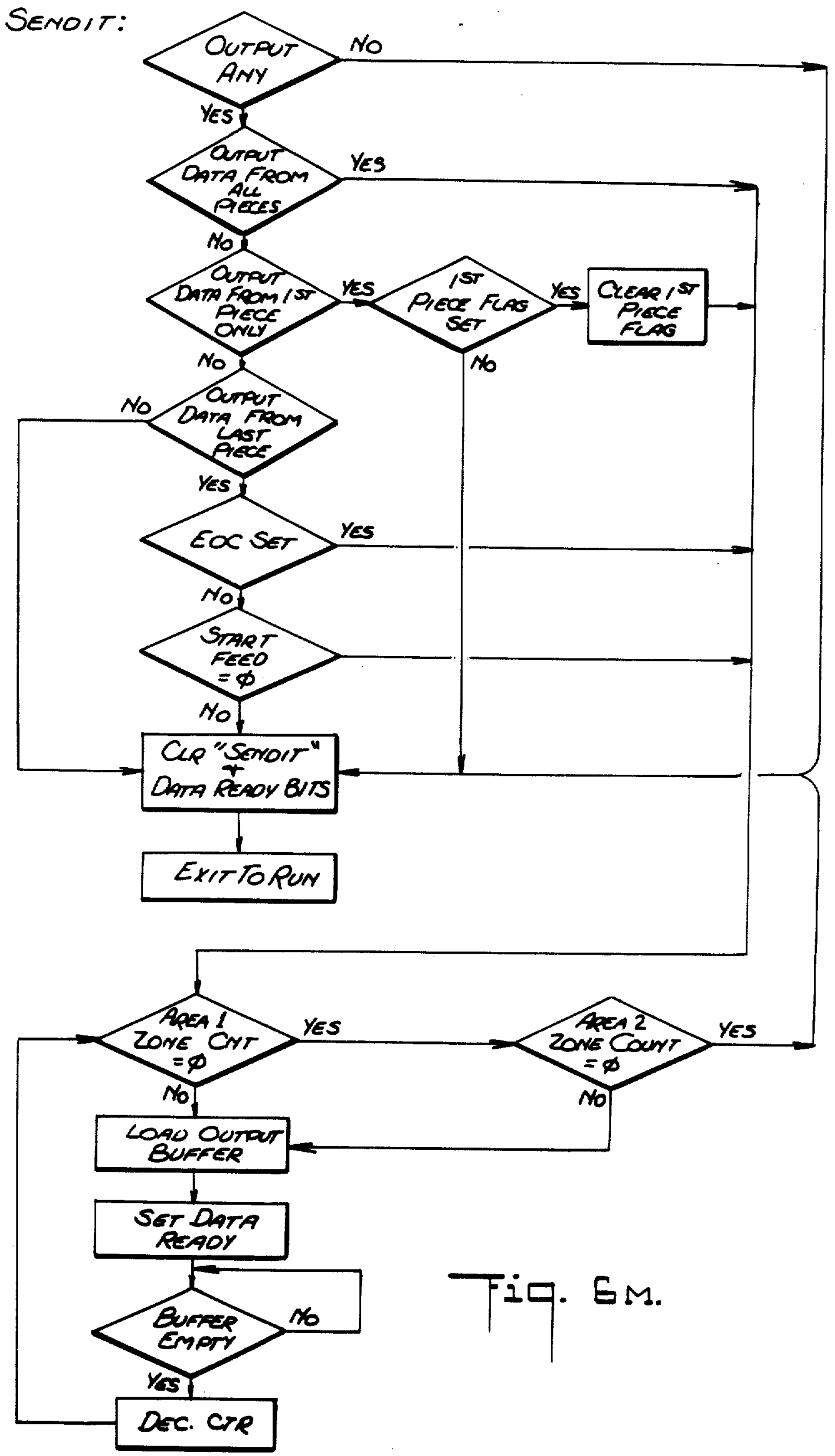
Figure 6N:
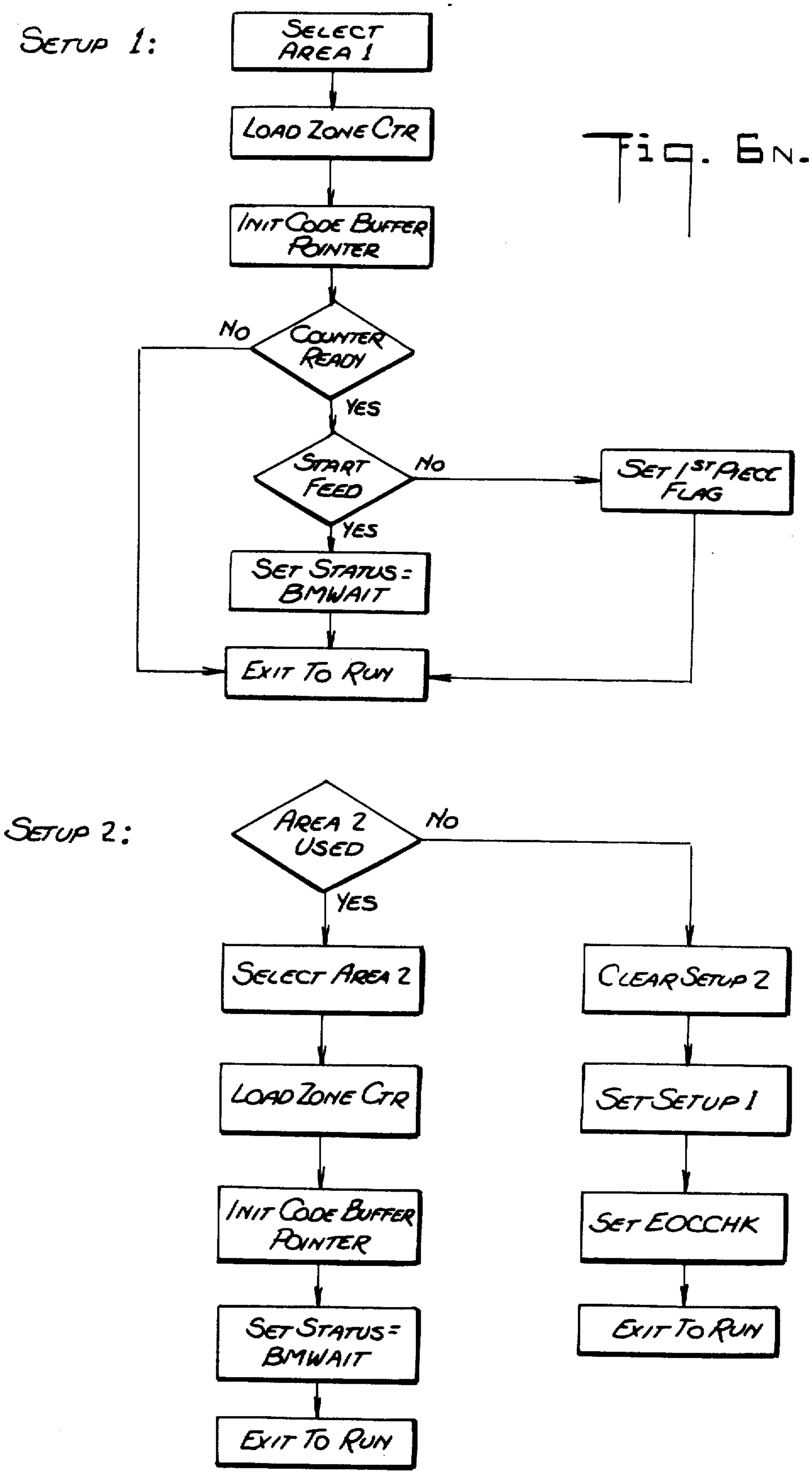
Figure 6P:
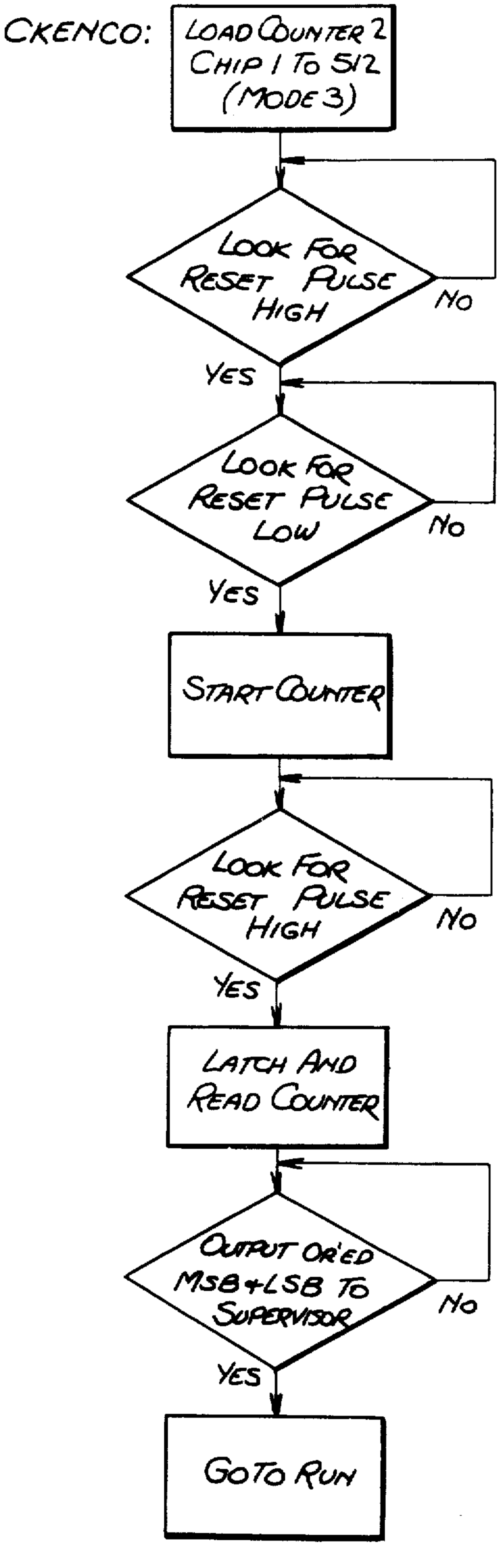
Figure 6Q:
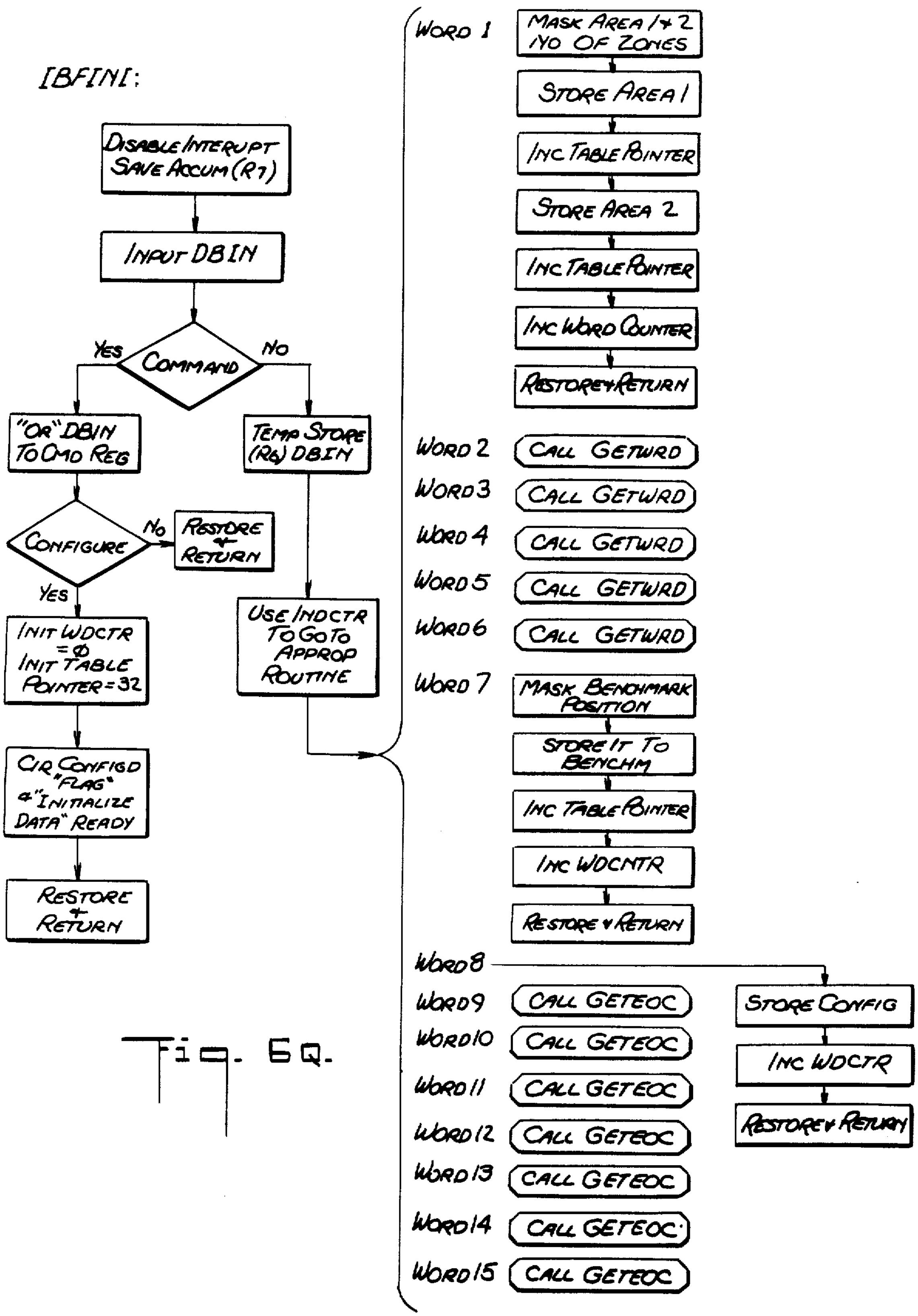
Figure 6R:
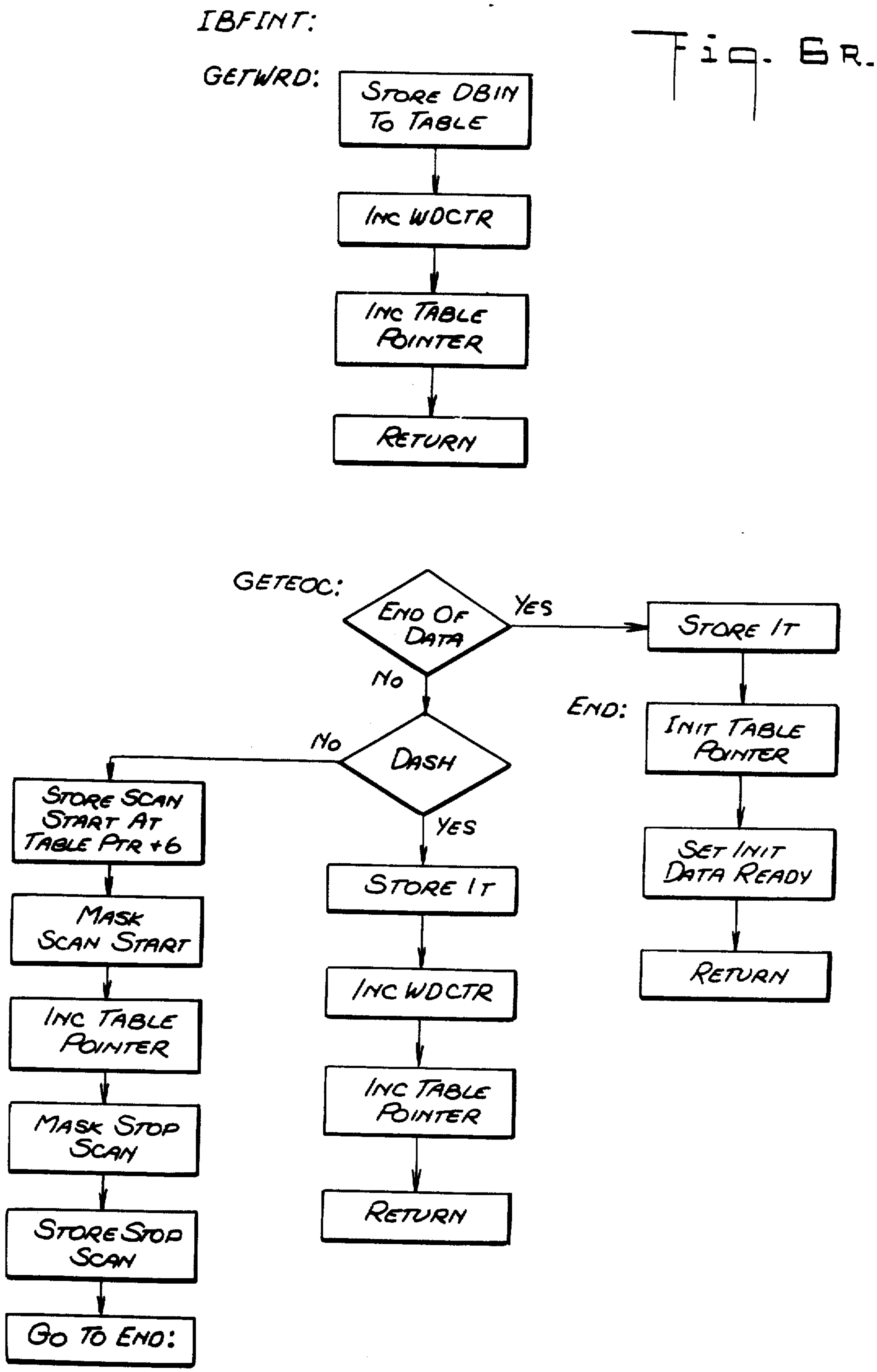

Referring to FIG. 4, the scanner interface circuit 160 for the optional scanner interface circuit illustrated in FIG. 3 and the scanners for the feeder modules shown in FIG. 2 is illustrated. The flow chart for the program for the scanner interface circuit 160 is illustrated in FIG. 6 as 150. The program listing therefore is set forth in the accompanying microfiche appendix. The scanner interface circuit 160 uses a portion of the address code of its associated feeder interface circuit 110 and receives this address code over address leads 161 coupled to the thumb wheel switch 112 of its associated feeder interface circuit 110. See the above-noted copending application entitled "FEEDER INTERFACE CIRCUIT FOR UNIVERSAL MULTI-STATION INSERTER". A comparator 162 receives the remaining address from the central processor 100 over the signal bus 96 comprising a first set of inputs 164 and the address leads 161 comprising a second set of inputs 161 and provides an output signal on leads 166 when there is a coincidence therebetween. The presence of an output signal on lead 166 causes a signal to be applied to the port CS (chip select) which activates the distributed microprocessor 168. Further the presence of a signal on lead 166 also activates one-shot circuit 169 to provide an internal transfer acknowledge signal to the central processor 100 which indicates that the distributed microprocessor 168 has received data from the central processor 100. The central processor 100 transfers data through data leads 170 to program the microprocessor 168. A port expander 172 such as type 8243 available from Intel Corp. is coupled to the microprocessor 168 over leads 174. The input leads 175 of the port expander 172 are coupled to photocells (not shown) for reading the dash codes present in the coded documents. The programmed microprocessor 168 and port expander 172 program a first programmable counter 176 and a second programmable counter 178 in accordance with the data read over data lines 170 from the central microprocessor 100, to provide timing signals to the microprocessor 168 and port expander 172 for reading the dash codes through input leads 175. Output data from the microprocessor 168 is applied over leads 180 to corresponding input ports of the programmable counters 176 and 178. Further input signals are also provided to the programmable counters 176 and 178 from output ports of the port expander 172 and scanner encoder (not shown) on leads 182 and 184 respectively to the programmable counters 176 and 178 to monitor the distance the coded document has traveled for each preset increment of paper travel. In addition to providing output signals 180 to the programmable counters 176 and 178, the feeder microprocessor 120 provides start scan signal thereto. Two programmable counters 176 and 178 are provided so that different discreet areas on a document may be selectively scanned skipping intermediate areas, as desired. Each programmable counter 176 and 178 includes port groupings 0, 1, and 2. Port grouping 0 provides information for setting the photocells to begin scanning at a predetermined distance from the edge (top or bottom) of a document. Port grouping 1 provides a predetermined distance for scanning after reaching the point where scanning commences. That is, port 1 grouping opens a window where the photocells begin scanning for the first dash of the dash code to set up timing for the subsequent dashes. Port grouping 2 specifies a predetermined distance by which the individual dashes of the dash codes on the documents may be separated. For example, programmable counter 176 may be set to begin counting four inches from the bottom of the document and the programmable counter 178 may be set to begin counting eight inches from the bottom of the document, thereby scanning separate and discreet areas of the coded document.

The output signals from the programmable counters 176 and 178 and the select signal from port expander 172 are transmitted to a multiplexer 184 which supplies input signals to the microprocessor 168 for selecting next scanning zone and the next scanning zone and the next scanning sequence for the microprocessor 168. Encoder signals are provided to the programmable counters 176 and 178.

Referring to FIG. 2, the accessory interface 105 receives input signals from the signal bus 96 and power bus 98 and provides output signals to activate various accessories such as postage meters 78 and 80, a rotatable envelope table, and power stackers 82 through 94.

To commence inserter operation, an on/off key switch is activated with the key being removable in the off position. The operator then starts the inserter 40 by first selecting a continuous or one cycle switch and then activating a sequence start switch on the central control display 34 when its sequence start switch is activated the central processor 100 sends a command to activate the last feeder module 76; that is, the feeder module 76 most remote from the envelope feeder 48 is activated to feed the required number of documents. The next feeder module 74 in sequence is then activated on command from the central processor 100 and the documents are fed from the feeder 74. Document feeding continues, sequentially in this fashion from one feeder module to the next to provide a complete coalation of documents at the envelope feeder 48. It should be understood that the control document scanner of feeder module 76 is initialized during power up of the inserter.

In contrast when the inserter is to be shutdown, the operator activates a clear deck switch on the central control display 34 and the same process which occurred with the sequence start sequence is repeated, with the exception that the feeder station 76 most remote from the envelope feeder 48 is deactivated after feeding the desired documents and then feeders 4 through 50 are deactivated sequentially to provide a complete collation of documents at the envelope feeder 48 for insertion therein to insure that a partial collation of documents is not left on the transport deck of the document inserter. Operation of the inserter 40 then ceases. Further details regarding the sequence start and clear deck (sequence stop) modes can be obtained from the above-noted application entitled "MULTI-STATION DOCUMENT INSERTER WITH AUTOMATIC STARTUP AND SHUTDOWN DOCUMENTATION COLLATION SEQUENCES".

After the sequence start cycle is completed the inserter 40 continues its operation. If the operator chooses, the sequence start cycle can be skipped and a start transport switch can be activated which places inserter 40 in non sequence mode. With either approach, the scanner interface circuit 160 of the control document feeder 76, the last feeder in FIG. 2, reads the dash code marks on the document and transmits them to the central processor 100. During initialization of the scanner interface circuit 160 by the central processor 100, the scanner interface circuit 160 is programmed with the appropriate scanner timing for reading the codes. The central processor 100 then transmits the address code and feed command to the associated feeder module 76. As is apparent from the accompanying flow charts and microfiche appendix it should be understood that the feed command may include signals other than simply feed such as among others, feed more than one, number of documents fed, initialize and diagnostic mode. Feeder module 76 then feeds the required documents in accordance with the feeder program stored therein for that particular type of feeder module. When the scanner interface circuit 160 determines that the last document for that particular collation package has been fed from feeder 76, the scanner interface circuit 160 transmits and end of collation signal to the feeder interface circuit 110 which ceases document feeding at that station. The documents fed from feeder 76 are then transported along the transport deck to the next feeder station 74, with this process being repeated from station to station so that a properly collated stack of documents arrives at the envelope feeder 48.

The transport encoder 198 provides pulses representing an increment of document travel along the document transport deck or path. The transport encoder 198 communicates these pulses to the central processor 100 which keeps track of the pulse count. The central processor 100 keeps track of the encoder count and issues a feed command to the appropriate feeder module when the appropriate count is reached. This count may be the same for all feeder modules or it may vary as desired.

Error conditions in the document feed are transmitted from the feeder interface circuit 110 for the particular feeder station to the central processor 100 for display on the central control display 34 describing to the operator the fault location and a description thereof in human readable form. After the document feeding at each feeder module is complete, the data representing the document is transmitted to the central processor 100 and stored in the RAM updating the data table representing that document. Details regarding the diagnostic mode can be obtained from the above patent application entitled "DIAGNOSTIC MODE FOR A MULTI-STATION DOCUMENT INSERTER".

The operator may change or reconfigure the supervisory control circuit 100 by activating certain switches of the central control display 34 so that the mirror image of the data table in the configuration PROM which is present in the RAM is changed. Details of the central control display and the ability of the operator to reconfigure the inserter is found in the above-noted pending application entitled "USER FRIENDLY CENTRAL CONTROL DISPLAY FOR A MULTI-STATION DOCUMENT INSERTER".

While this invention has been described in conjunction with a specific embodiments thereof, it is evident that many alternative modifications and variations will be apparent to those skilled the art. Accordingly, it is intended to embrace all such alternatives, modifications and variations that fall within the spirit and scope of the appended claims.

What is claimed is:

1. In a document inserter having a plurality of feeder stations, a central processor for providing a control signal to the feeder stations, the central processor having a supervisory program stored therein including a data table and a configuration PROM which includes information on the type of feeder stations and the functions to be performed thereby and a feeder interface circuit having a unique address code and which receives address and command signals from the central processor, scanner interface circuits associated respectively with scanners at each of the feeder stations comprising:

address means for providing each scanner with a unique address code a portion of which is identical to the address code of the feeder station with which it is associated, distributed processor means for storing a scanner program containing instructions for scanning coded documents, and means interconnecting the scanner interface circuit, the feeder interface circuit and the central processor for enabling scanning of a document at each feeder station in response to appropriate addresses and commands from the central processor.

2. A scanner interface circuit as set forth in claim 1 and further including comparator means for comparing address data received from the central processor with the unique address provided by the address means to provide an acknowledge signal where there is coincidence between the address data and the unique address.

3. A scanner interface circuit as set forth in claim 1 wherein the address means for providing a unique address includes a user operated switch for predetermining the unique address.

4. A scanner interface circuit as set forth in claim 1 and further including means for transmitting an end of collation signal to its associated feeder interface circuit.

5. A scanner interface circuit as set forth in claim 1 and further including means for providing a document present signal to the scanner interface circuit.

6. The scanner interface circuit as set forth in claim 1 and further including programmable counters for providing timing signals for reading the code on coded documents.

7. A method for scanning coded documents in a document inserter having a plurality of feeder stations, a central processor for providing a control signal to the feeder stations, the central processor having a supervisory program stored therein including a data table and a configuration PROM which includes information on the type of feeder stations and the functions to be performed thereby and a feeder interface circuit which receives address and command signals from the central processor, comprising the steps of:

providing a scanner interface circuit associated respectively with scanners at each of the feeder stations, providing each scanner with a unique address code which uses a portion of the address code of the feeder station with which it is associated, storing a scanner program containing instructions for scanning coded documents in a distributed processor means, interconnecting the scanner circuit, the feeder interface circuit and the central processor, and scanning documents at each of the feeder stations for communicating data between the central processor and the distributed processor means in response to appropriate address and command data from the central processor.

8. A method as set forth in claim 7 and further including comparing address data received from the central processor with the unique address provided by the address means to provide an acknowledge signal where there is a coincidence between the address data and the unique address.

9. A method as set forth in claim 7 and further including transmitting an end of collation signal to the central processor.

10. A method as set forth in claim 7 and further including communicating a document present signal to the scanner interface circuit.

11. A method as set forth in claim 7 and further including providing timing signals for reading the code on said coded documents.

* * * * *